(12) United States Patent
Ebert et al.

(10) Patent No.: US 11,838,204 B2
(45) Date of Patent: Dec. 5, 2023

(54) SCALABLE SYSTEM AND METHOD THAT USE LOGICAL ENTITIES FOR PRODUCTION OF PROGRAMS THAT USE MULTI-MEDIA SIGNALS

(71) Applicant: LTN GLOBAL COMMUNICATIONS, INC., Columbia, MD (US)

(72) Inventors: Joa Diego Ebert, Bielefeld (DE); Andreas Jacobi, Cologne (DE); Malik Khan, Bethesda, MD (US)

(73) Assignee: LTN Global Inc., Columbia, MD (US)

( * ) Notice: Subject to any disclaimer, the term of this patent is extended or adjusted under 35 U.S.C. 154(b) by 88 days.

(21) Appl. No.: 17/246,946

(22) Filed: May 3, 2021

(65) Prior Publication Data

US 2022/0353178 A1 Nov. 3, 2022

Related U.S. Application Data

(60) Provisional application No. 63/018,969, filed on May 1, 2020.

(51) Int. Cl.
*H04L 45/302* (2022.01)
*H04L 65/65* (2022.01)
*H04L 65/70* (2022.01)

(52) U.S. Cl.
CPC .......... *H04L 45/3065* (2013.01); *H04L 65/65* (2022.05); *H04L 65/70* (2022.05)

(58) Field of Classification Search
CPC ..... H04L 45/3065; H04L 65/65; H04L 65/70; H04L 45/306; H04L 45/308; H04L 65/752; H04L 65/756; H04L 9/40; H04L 65/1066–1073; H04L 67/14; H04L 67/141; H04L 67/142
See application file for complete search history.

(56) References Cited

U.S. PATENT DOCUMENTS

| | | | |
|---|---|---|---|
| 2003/0093526 A1* | 5/2003 | Nandagopalan | H04L 65/80 709/225 |
| 2018/0227636 A1* | 8/2018 | Truong | H04N 21/47815 |

\* cited by examiner

*Primary Examiner* — Jonathan A Bui
(74) *Attorney, Agent, or Firm* — Vector IP Law Group; Robert S. Babayi

(57) ABSTRACT

According to the present invention, programs that use signals, such as multi-media signals, received over communication channels from one or more sources are produced in a computing system by executing an application software in one or more servers of the computing system. At least one of the servers has one or more processors that process defined logical entities. A signal used in production of a program is received from a source over a communication channel at a server. An input logical entity having attributes associated with the source of the signal is defined such that the input logical entity is responsive to a user defined predicate comprising a logical expression for accepting or rejecting the signal. Also defined are a stream logical entity that identifies an accepted signal and a routing logical entity that establishes a connection between the stream logical entity and a destination. The accepted signal is routed to the destination based on a routing rule.

14 Claims, 25 Drawing Sheets

```
INPUT    =   {
    OWNER:          UUID
    ENDPOINTS:      ( ) → STRING[ ]
    ROUTINGRULES:   UUID [ ]
    PREDICATES:     PREDICATE [ ]
    STATE:          "ONLINE" | "OFFLINE" | "ERROR" | "UNKNOWN"
    METADATA:       MAP<STRING, STRING>}
PREDICATE =   (INPUT, STREAM) → BOOL
```

*FIG. 4*

```
ROUTINGRULE        {
    SOURCE:        UUID
    TARGET:        UUID    |   STRING
    PREDICATES:           PREDICATE [ ]
}
```

SCALABLE SYSTEM AND METHOD THAT USE LOGICAL ENTITIES FOR PRODUCTION OF PROGRAMS THAT USE MULTI-MEDIA SIGNALS

FIELD OF INVENTION

The invention generally relates to a system and method for production of programs that require filtering and routing of multi-media (e.g., audiovisual) signals used in the programs.

BACKGROUND

During production of programs, streams originated at multiple sources are enriched before being ultimately presented to consumers. As used herein a program can be any one or combination of streamed content used for consumption by any audience, user, viewer, subscriber, etc. While streamed multi-media content contains both video and audio data, such streaming is often referred to as video streaming or streaming with the understanding that streams carry both video and audio data. This specification refers to multi-media streaming, video streaming and streaming interchangeably.

Systems used in live production, post-processing, and distribution of programs through streaming are known. Also known are streaming services used for delivering video/audio data to consumers via the Internet (or other networks). Typically, these services employ media servers that divide programs into segments, encode each segment, and transport encoded segments to client devices over a wide variety of transport protocols. The client devices receive the transported segments, decode the segments, and present the decoded segments in appropriate formats to consumers, including viewers of multi-media streams. Video and audio codec formats refer to technologies used to both create and play back digital video and audio. Each format specifies how video and audio is combined. Video transcoding, sometimes called video encoding, is conversion from one digital encoding format to another, such as for movie data files. Video transcoding involves translating three elements of a digital video at the same time—the file format, the video, and the audio. A video engine is underlying code used to support High Definition (HD) recording, playback, and editing.

Video on demand (VOD) is a known distribution service employed by such companies as NetFlix, Apple, etc, who are owners or publishers of streams conveyed to subscribers. VOD allows such subscribers to access multi-media streams without the constraints of static broadcasting schedules. Also known is live streaming of public or private programs where content originated at venues, such as stadiums, concert halls, TV studios, etc. are transmitted to viewers in real time using the Internet. In live streaming deployments that use the Internet Protocol (IP), it is known to route packetized live streams for production before distributing the produced streams to viewers. Such production can involve insertion of information used to enrich, change, modify or qualify types of the streams by for example inserting adverts, closed captioning, etc.

Live streaming can, for example, be implemented over the Internet using systems and methods disclosed in U.S. Pat. No. 8,599,851 issued to Amir et al. titled "System and method that routes flows via multicast flow transport for groups"; U.S. Pat. No. 8,437,267 issued to Amir et al. titled "System and method for recovery of packets in overlay networks"; U.S. Pat. No. 8,619,775 issued to Amir et al. titled "Scalable flow transport and delivery network and associated methods and systems"; U.S. Pat. No. 9,106,569 issued to Amir et al. titled "System and method that routes flows via multicast flow transport for groups"; and U.S. Pat. No. 8,181,210 issued to Amir et al. titled "Method for delivery of deadline-driven content flows over a flow transport system that interfaces with a flow delivery system via a selected gateway." These patents which are owned by LTN Global Communications, Inc. of Columbia, Md., the assignee of the present application, are hereby incorporated by reference.

When packets are sent between two nodes, they encounter a slew of transport obstacles like bandwidth fluctuations, packet losses, etc., which degrade streaming quality. Various transport protocols have been developed to improve the quality. For example, SRT is a transport protocol that delivers high-quality streams at low latency over noisy networks like the Internet. The protocol optimizes transport of streams over unpredictable networks by adapting to real-time network conditions, minimizing packet loss and creating a better viewing experience.

Hypertext Transfer Protocol (HTTP) Live Streaming (HLS) is an HTTP-based adaptive bitrate streaming communications protocol developed by Apple for implementation using web browsers executed in clients' devices. For example, when a client requests a stream such as by a click on a hyperlink, a browser sends a request message to a HTTP server for the requested stream. The server receives the request and sends a response message with the stream to the browser. However, the HTTP server maintains no information about the client, and if the client asks for the same stream again, the server resends the stream. For this reason, HTTP is called a stateless protocol. HTTP can use both non-persistent or volatile connections and persistent connections. A volatile connection is a connection that is closed after a HTTP server sends a requested stream to a client. In other words, the connection is used for one request and one response. With persistent connections, the HTTP server leaves the connections open after sending the response and hence subsequent requests and responses between the same client and server can be exchanged. The server closes a connection only when it is not used for a certain configurable amount of time. HLS works by breaking the overall stream into a sequence of small HTTP-based file downloads, each download containing one short chunk of an overall potentially unbounded stream.

Real-Time Messaging Protocol (RTMP) is a TCP-based protocol which maintains persistent connections and allows for low-latency communication. To deliver streams smoothly and transmit as much information as possible, RTMP splits streams into fragments, and their size is negotiated dynamically between clients and servers. RTMP defines several independent virtual channels used for sending and receiving packet streams.

Real-time Transport Protocol (RTP) is a network protocol for delivering streams over IP networks. RTP is used in communication and entertainment systems that involve streaming and video teleconferencing. RTP typically runs over User Datagram Protocol (UDP). RTP is used in conjunction with the RTP Control Protocol (RTCP). While RTP carries the streams, RTCP is used to monitor transmission statistics and quality of service (QoS) and aids synchronization of multiple streams. Real Time Streaming Protocol (RTSP) is a network control protocol designed for use in entertainment and communications systems to control media servers. The protocol is used for establishing and controlling media sessions between endpoints. The transmission of streaming video/audio data itself is not a task performed by RTSP. Most RTSP servers use the RTP in conjunction with RTCP for streaming. One application of RTP is in Web Real-Time Communication (WebRTC), a free, open-Source project that provides web browsers and mobile applications with real-time communication (RTC) via application programming interfaces (APIs). It allows for streaming inside web pages using direct peer-to-peer communication, thereby eliminating the need to install plugins or download native applications. Streamtag when used with WebRTC is generated out-of-band by a system component and flows downstream parallel with a stream. Streamtag can be forced to stop propagating by another system component.

Moving Picture Experts Group (MPEG) transport stream (also known as transport stream, MPEG-TS, MTS or TS) is a standard digital container format for transmission and storage of audio, video, and Program and System Information Protocol (PSIP) data. TS streams that include Program Specific Information (PSI) can be transported over TCP/IP. PSI is a set of tables carrying the necessary information to de-multiplex and present programs, such as Program Mapping Table (PMT).

Dynamic Adaptive Streaming over HTTP (DASH), also known as MPEG-DASH, is an adaptive bitrate streaming technique that enables high quality streaming over the Internet. MPEG-DASH can be delivered from conventional HTTP web servers. Like HLS, MPEG-DASH works by breaking the content into a sequence of small HTTP-based file segments with each segment containing a short interval of playback time of content that is potentially many hours in duration, such as a movie or the live broadcast of a sport events. The content is made available at a variety of different bit rates, where alternative segments are encoded at different bit rates covering aligned short intervals of playback time. MPEG-DASH allows devices like Internet-connected televisions, TV set-top boxes, desktop computers, smartphones, tablets, etc. to consume multi-media content delivered over Internet, thereby coping with variable Internet receiving conditions.

FIG. 1 shows implementation of content delivery in a system, which receives streams, for example bounded TS streams for programs, or Streamtag over unbounded WebRTC streams, or streams from an external device. These streams are ingested by media servers known as Ingest servers. The ingested streams can be sent to output devices, recorder devices or multi-view devices. For video production, various systems, platforms, hardware, software, networks, facilities, etc., are required to develop, test, deliver, monitor, control or support streaming. As video production is being implemented in IT infrastructure, video streams are "ingested" by bringing them from multiple venues into a production platform where users interface with one or more Ingest Servers.

As production process becomes more sophisticated, there exist a need for a flexible system and method that supports live streams in the cloud and allows for the extension of the platform without changing its structure. Such flexible system should support various transport formats as well as automated routing, monitoring and alerting.

SUMMARY OF THE INVENTION

Briefly, according to the present invention, programs that use signals, such as multi-media signals, received over communication channels from one or more sources are produced in a computing system by executing an application software in one or more servers of the computing system. At least one of the servers has one or more processors that process defined logical entities. A signal used in production of a program is received from a source over a communication channel at a server. An input logical entity having attributes associated with the source of the signal is defined such that the input logical entity is responsive to a user defined predicate comprising a logical expression for accepting or rejecting the signal. Also defined are a stream logical entity that identifies an accepted signal and a routing logical entity that establishes a connection between the stream logical entity and a destination. The accepted signal is routed to the destination based on a routing rule.

According to some of the more detailed features of the present invention, an output logical entity is defined that associates the stream logical entity with the destination such that the output logical entity transforms the stream logical entity according to a user defined program transformation rule that is evaluated for mapping the accepted signal to the destination. For example, the signal can be an MPEG signal, where the user defined program transformation rule is based on Program Specific information (PSI). In one embodiment, the stream logical entity is associated with Packetized Elementary Stream (PES), where the PSI includes Program Mapping Table (PMT) associated with the stream logical entity. In another embodiment, an inter arrival time (IAT) of packets of the MPEG signal is recorded at a server and used by the output logical entity for achieving a constant bitrate.

According to other more detailed features of the present invention, the routing rule is a user defined logical rule associated with the input logical entity such that a user defined logical rule is evaluated when the signal is applied to the input logical entity. In one embodiment, the user defined predicate is based on time of day, a geographical zone, a location or an IP address. In another embodiment, the input logical entity is defined as a persistent logical entity by a user such that the input logical entity is configured by the user via graphical user interfaces or Application Programing Interfaces (APIs). In still another embodiment, the stream logical entity is associated with a session tag that creates a topical connection and/or a unique identification (ID) of the owner or publisher of the signal.

According to yet another detailed features of the present invention, a characteristic of the signal is recognized based on a confidence level and the recognized characteristic is used as a metadata associated with the signal.

DETAILED DESCRIPTION OF THE DRAWINGS

FIG. 4 shows a functional block diagram for attributes of an Input, where a Device provides a Video Signal to an Ingest load balancer coupled to a plurality of Ingest servers.

FIG. 5, shows a portal for creating Input via a user interface.

FIG. 6 shows selection of the "General" tab, which allows the operator to enter generic information that would make the Input discoverable within the LVC platform.

FIG. 7 shows selection of the "Setting" tab, which contains SRT Push specific settings.

FIG. 8 shows a selected datacenter from a list where the URL is served from.

FIG. 9 shows other configurations like the latency, which in this example is set at 50 ms.

FIG. 10 shows predicates.

FIG. 11 shows creating a first predicate that accepts or admits Streams only from a given IP address and a second predicate that requires the Streams to be accepted or admitted between 8 pm and 10 pm.

Figure 12:
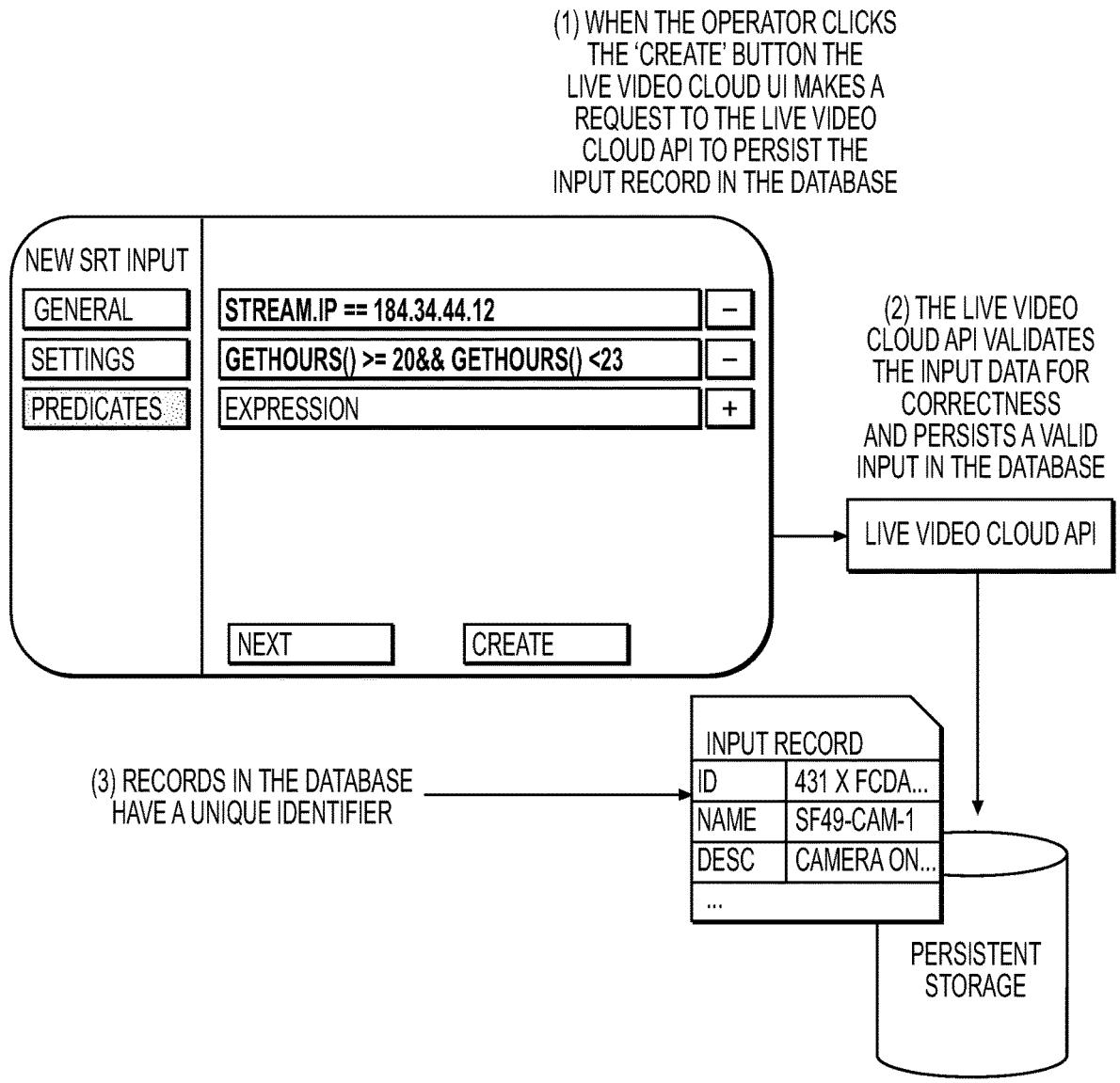

FIG. 12, when the operator clicks the 'Create' button, the LVC makes a request to relevant API to create a record for the created Input in the DBSM.

Figure 13:
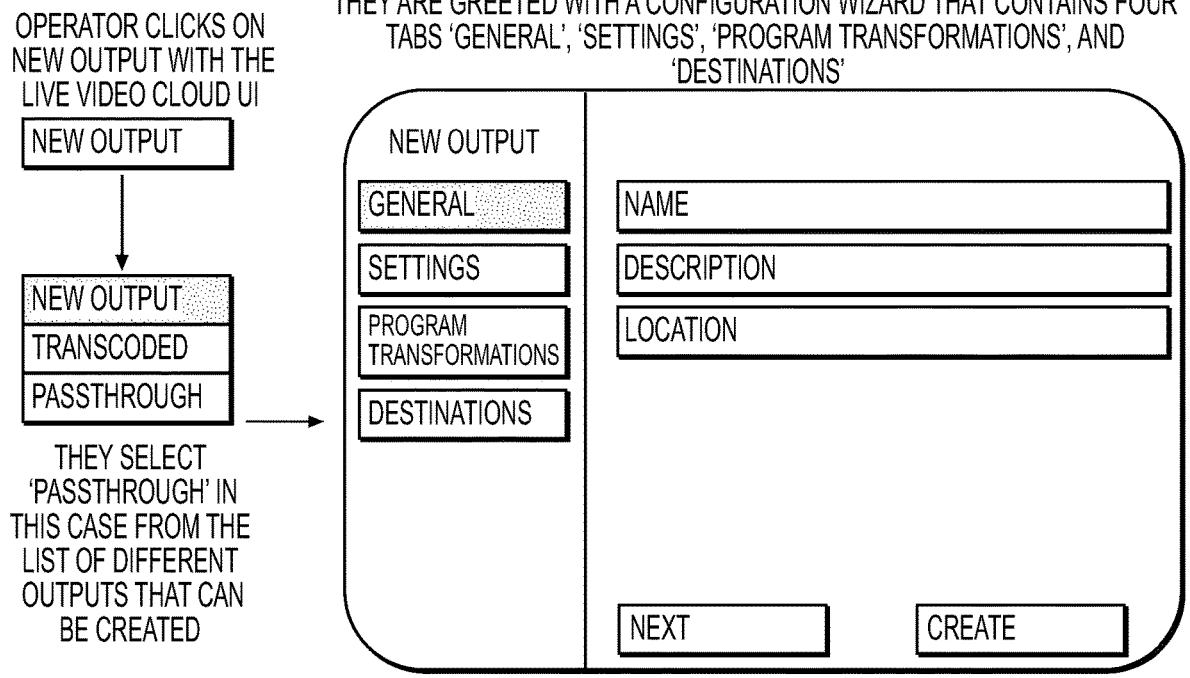

FIGS. 13-18 show the process for creating Outputs in the LVC platform according to the present invention, where:

FIG. 13, shows a portal for creating Output via a user interface.

Figure 14:
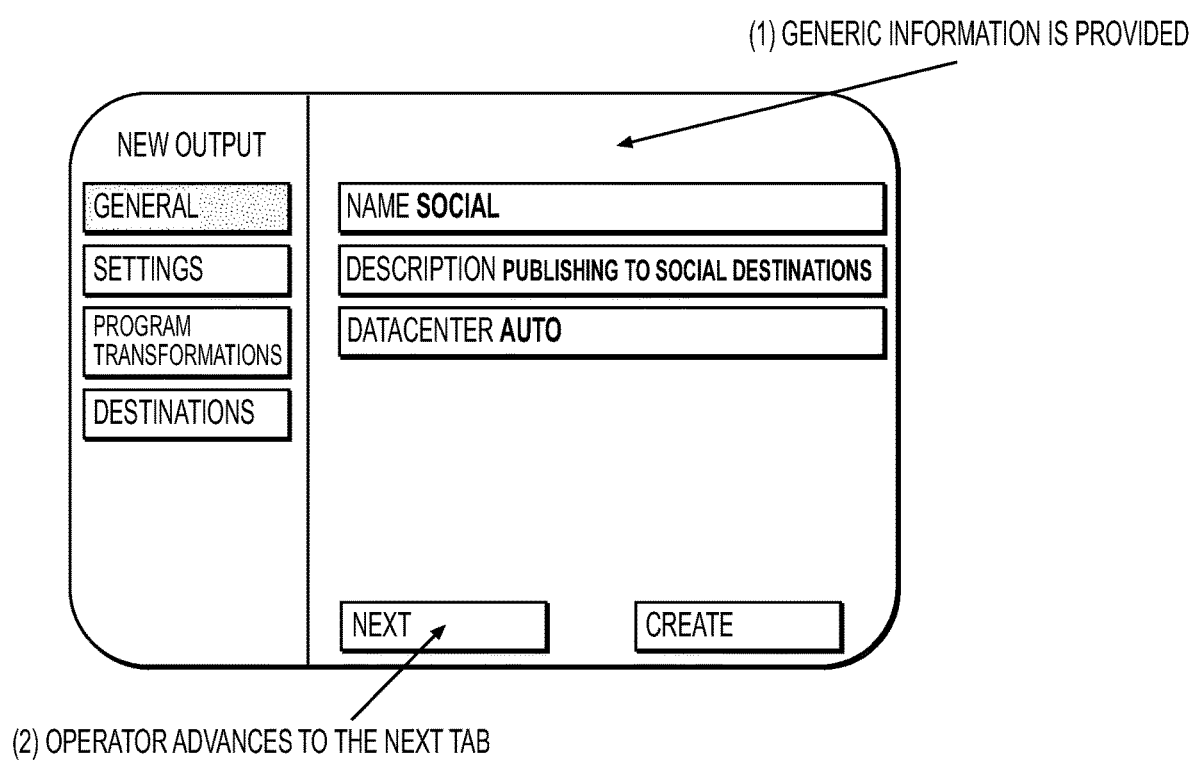

FIG. 14 shows selection of the "General" tab, which allows the operator to enter generic information that would make the Output discoverable within the LVC platform.

Figure 15:
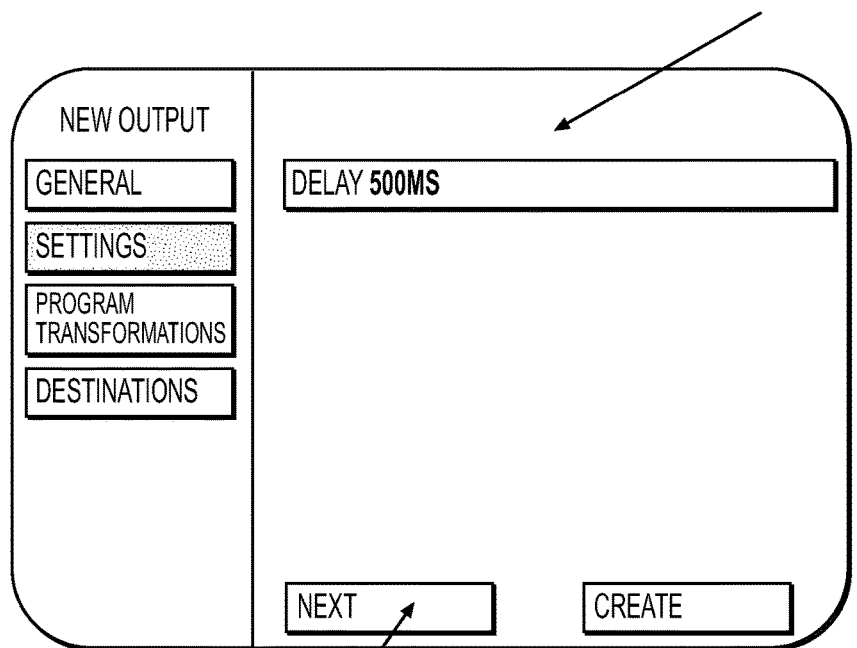

FIG. 15 shows selection of the "Setting" tab, which allows a user to set a delay, frame rate resolution as well as interlacing mode.

Figure 16:
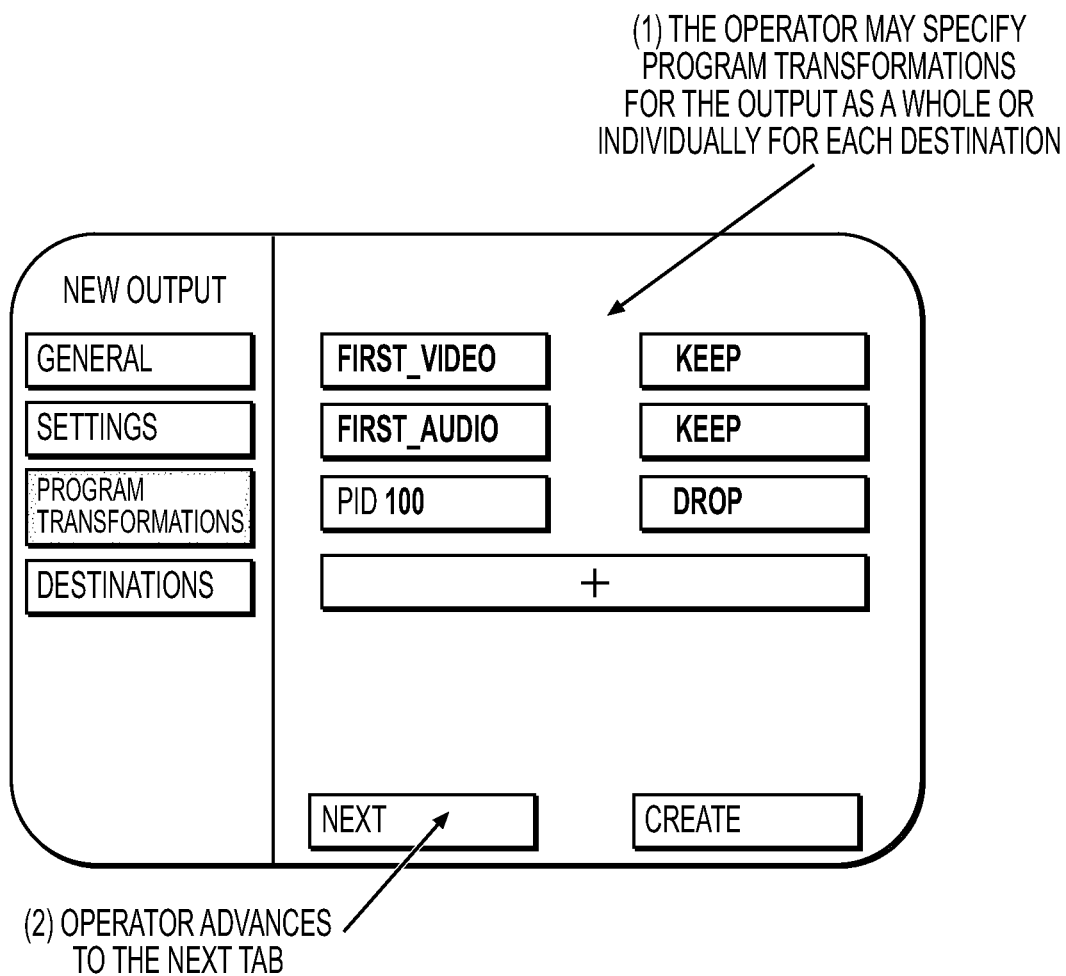

FIG. 16 shows selection of the "Program Transformations" tab, which allows a user to set Transformation parameters.

Figure 17:
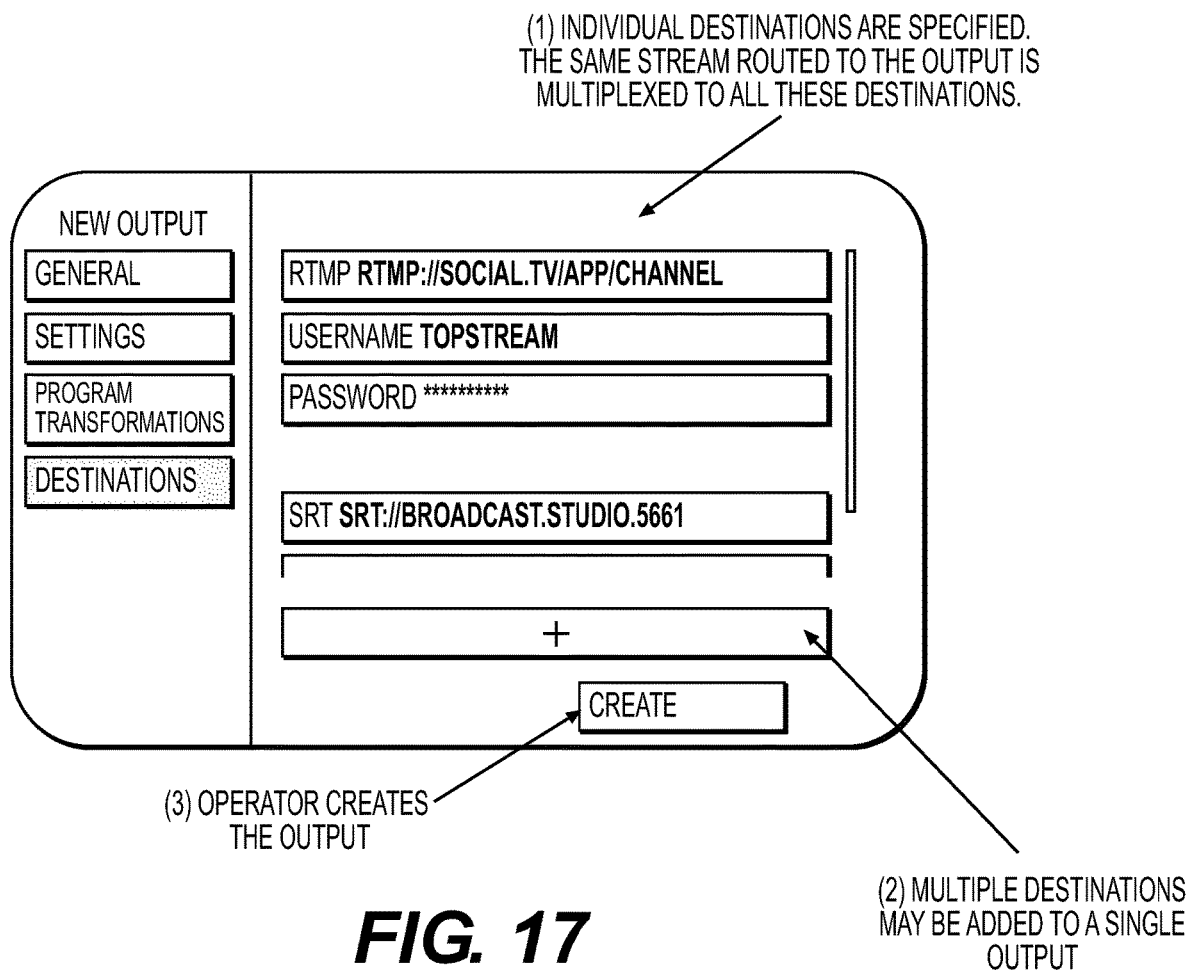
Figure 18:
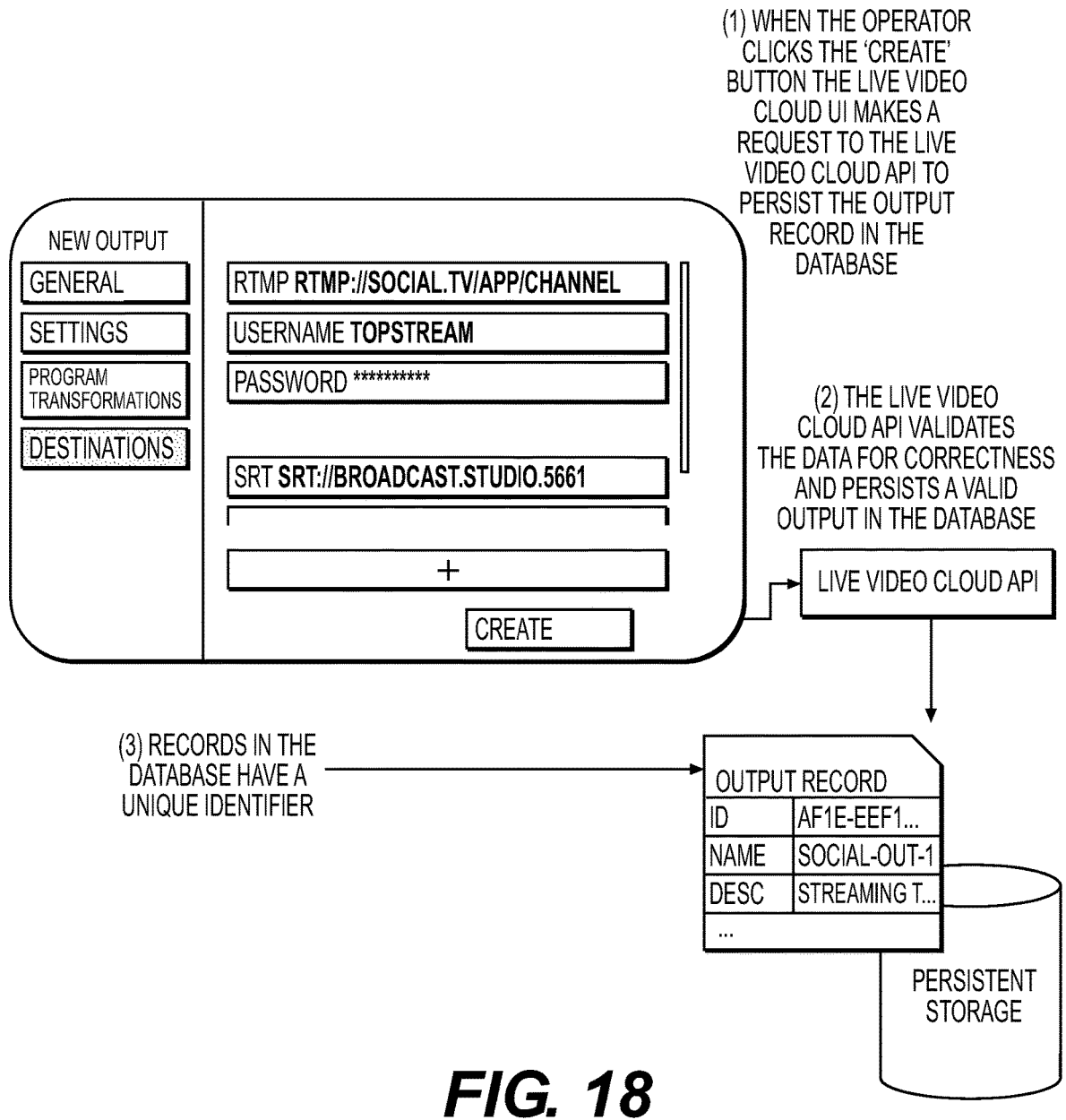

FIGS. 17 and 18 shows selection of the "Destination" tab, which allows a user to set destination parameters.

Figure 19:
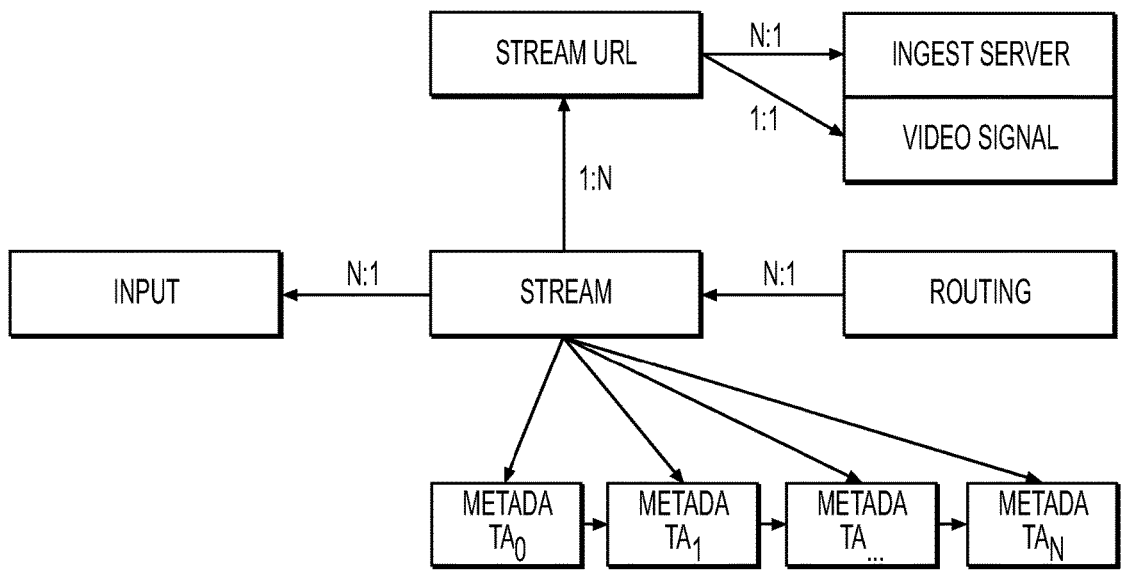

FIG. 19 shows attributes that define Streams.

Figure 20:
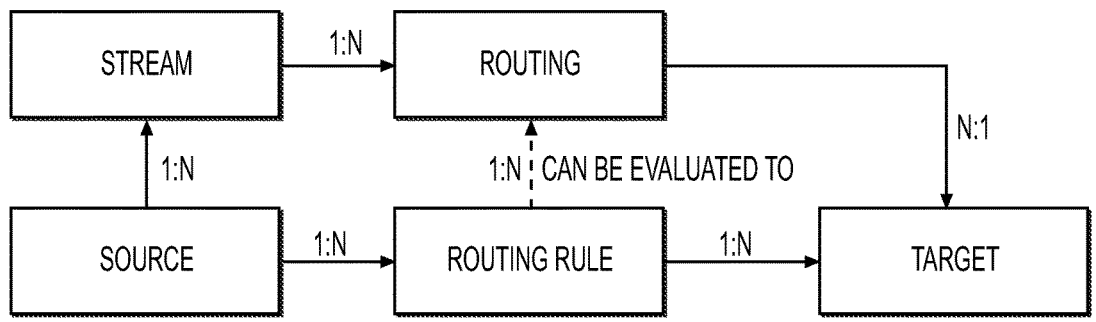

FIG. 20 shows implementation of Routing Rules.

Figure 21:
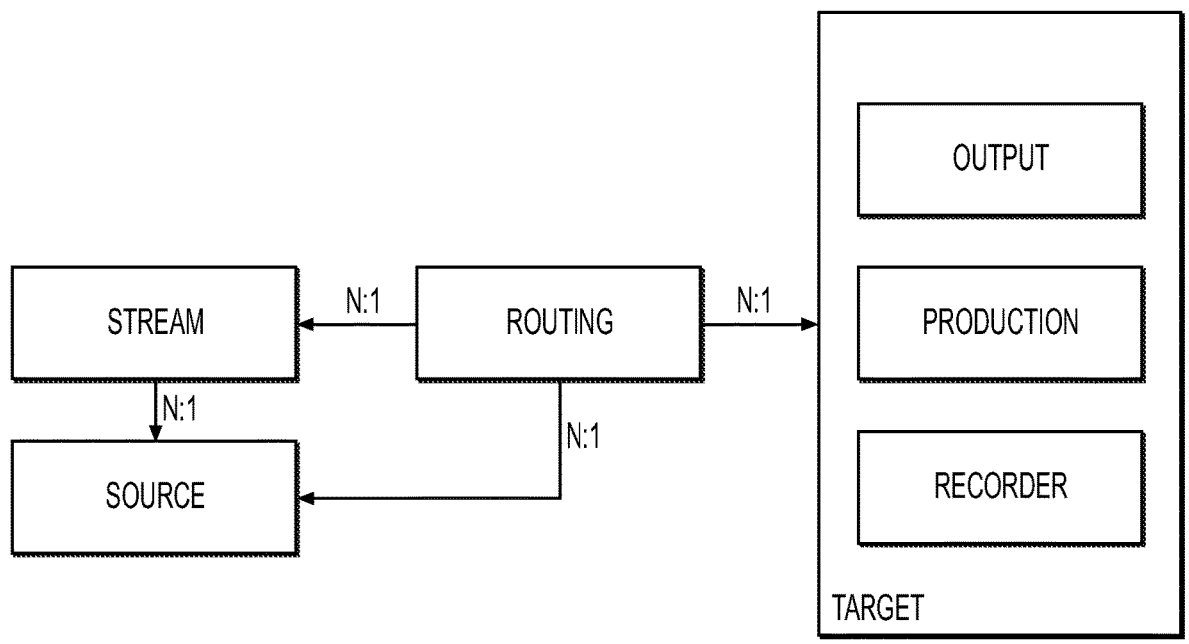

FIG. 21 shows Routing when connecting a Source of a Stream to a Target.

Figure 22:
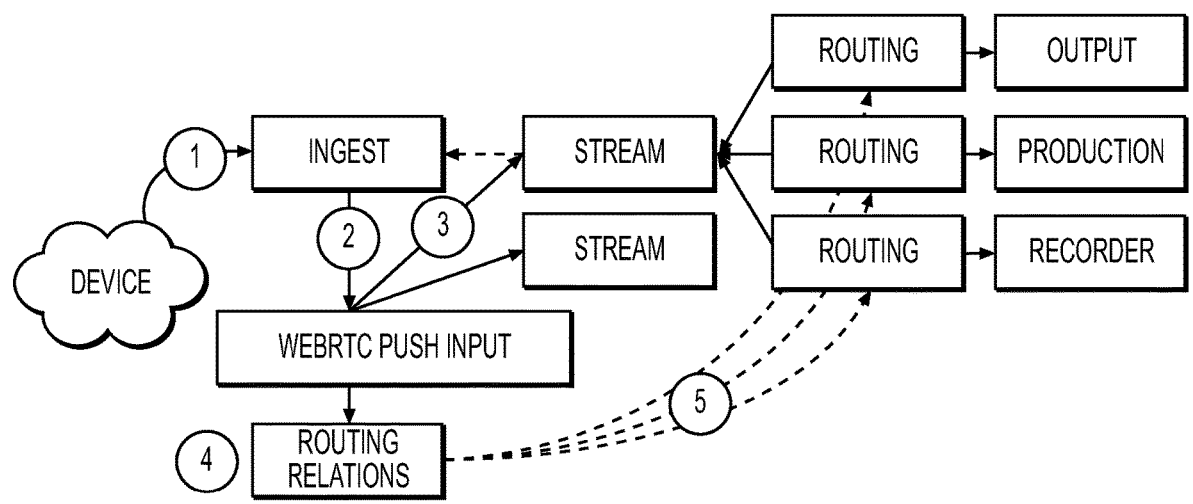

FIG. 22 shows example of a flow diagram amongst entities of the LVC platform.

Figure 23:
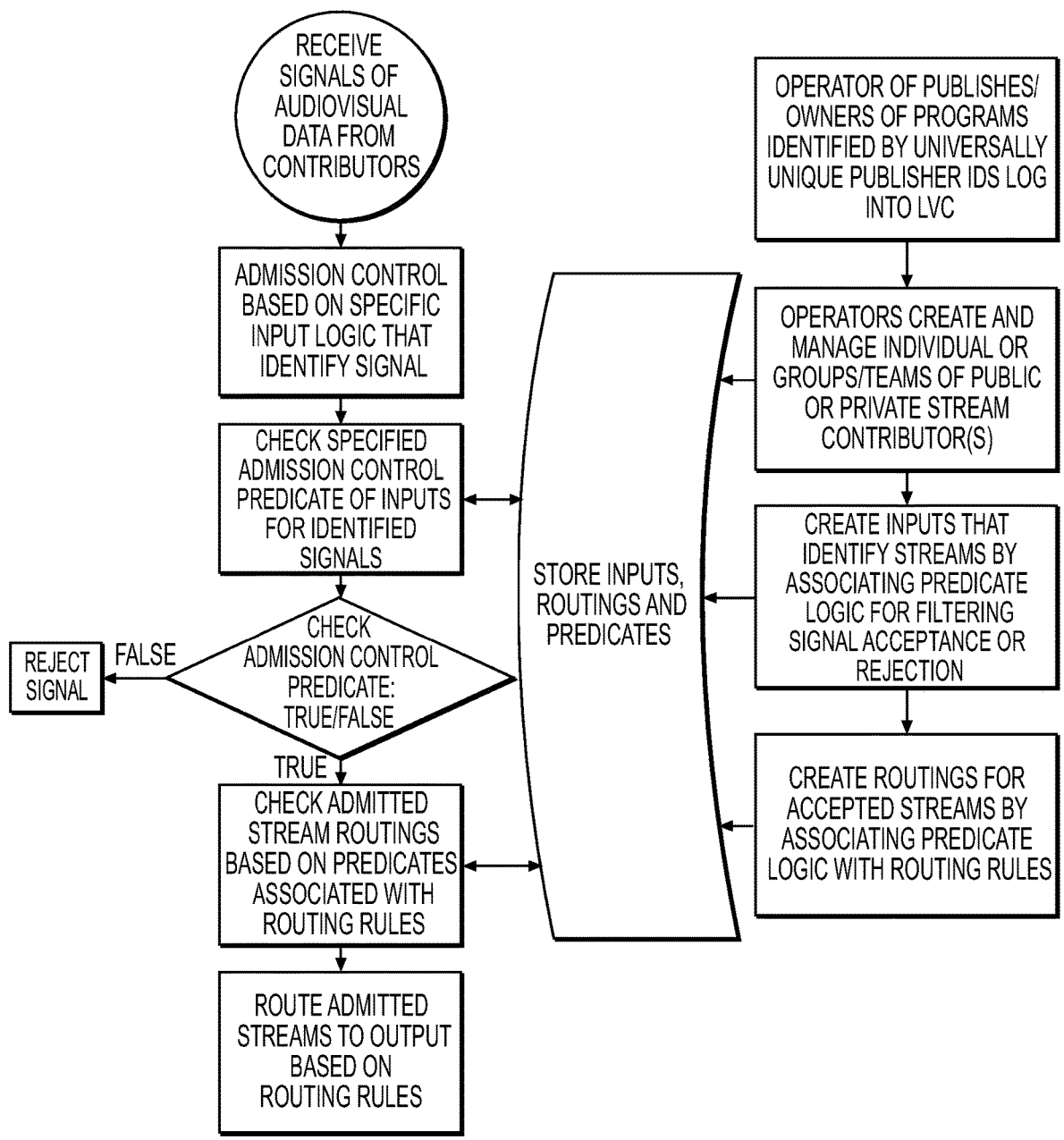

FIG. 23 shows a flow chart that exemplifies implementing an embodiment of the invention in a method implemented by logic in the LVC platform.

DESCRIPTION OF THE INVENTION

The following is the glossary of terms are used to describe the invention.

| | |
|---|---|
| Source | Any physical entity associated with an End Point used when outputting one or more Signals such as Signals outputted by a transcoder or a web browser. |
| Target/Destination | Any physical entity such as a transcoder or a recorder for routing one or more Streams. |
| Input | Any logical entity associated with End Point of a Source that serves as an authority for accepting or rejecting a Signal provided by the Source based on one or more user defined Input predicates. |
| Stream | Any logical entity that identifies an accepted Signal while the Signal is active over a communication channel. |
| Routing | Any logical entity that establishes a volatile connection between a Stream and a Target, which is valid if the Stream is valid. |
| Routing Rule | Logical rules associated with an Input, which are evaluated when a Signal appears at Input. |
| Ingest Server | A hardware or software implement server that accepts Video Signals |
| Device | Any physical entity that provides a Video Signal to an Ingest Server, such as an encoder or a web browser that for example contributes a Signal via WebRTC |
| Multi-media Signal | A physical video or audiovisual signal used in a program that if accepted by an Input is identifiable by a Stream |
| Signal | Abbreviation of Multi-media Signal |
| Endpoint | Any physical or logical entity that defines one end of a communication channel, such as a URL of a server or service. |
| Program Transformation | Logical rules associated with an Output which are evaluated when a multiplex of one or more Streams are generated. |
| Output | Any logical entity that associates one or more Streams with one or more Target/Destinations after transforming the one or more Streams according to Program Transformation. |

Figure 1:
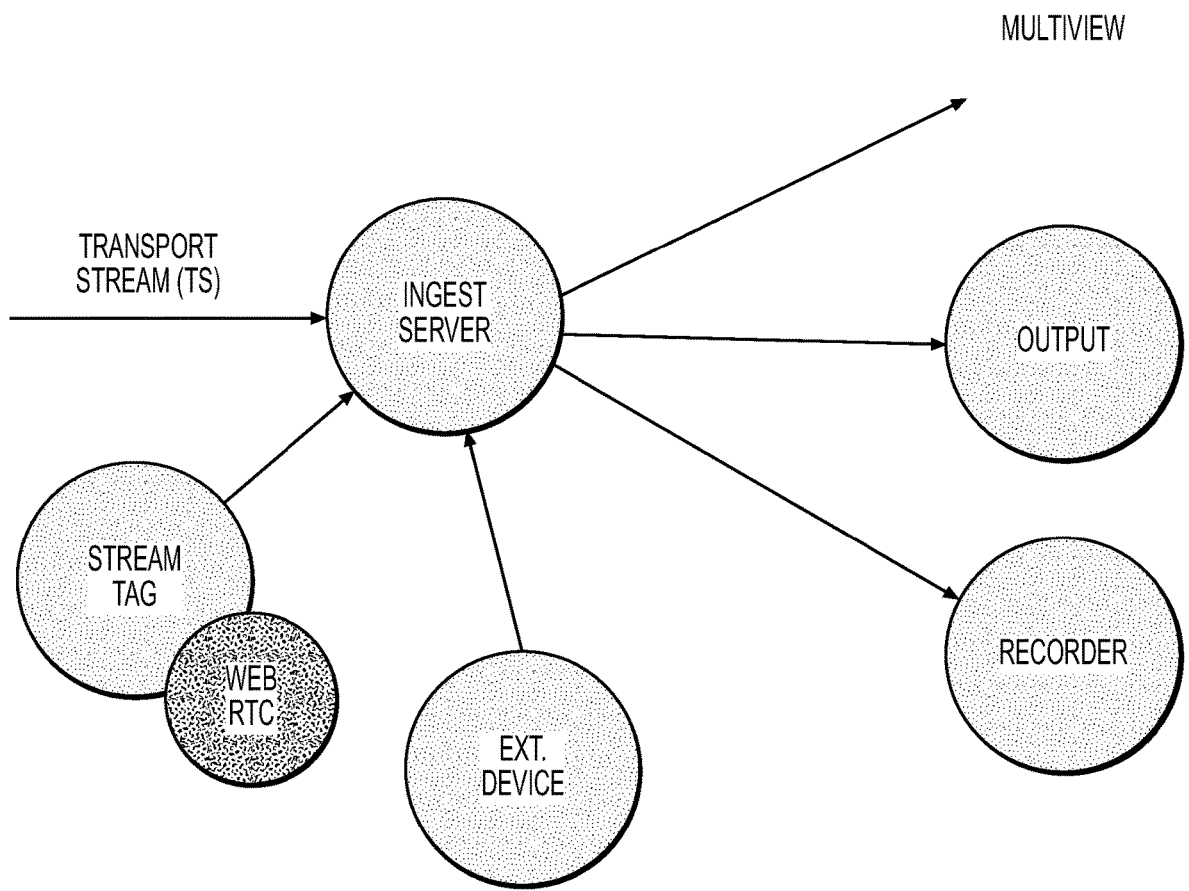
FIG. 1 shows implementation of content delivery in a system, which receives streams.
Figure 2:
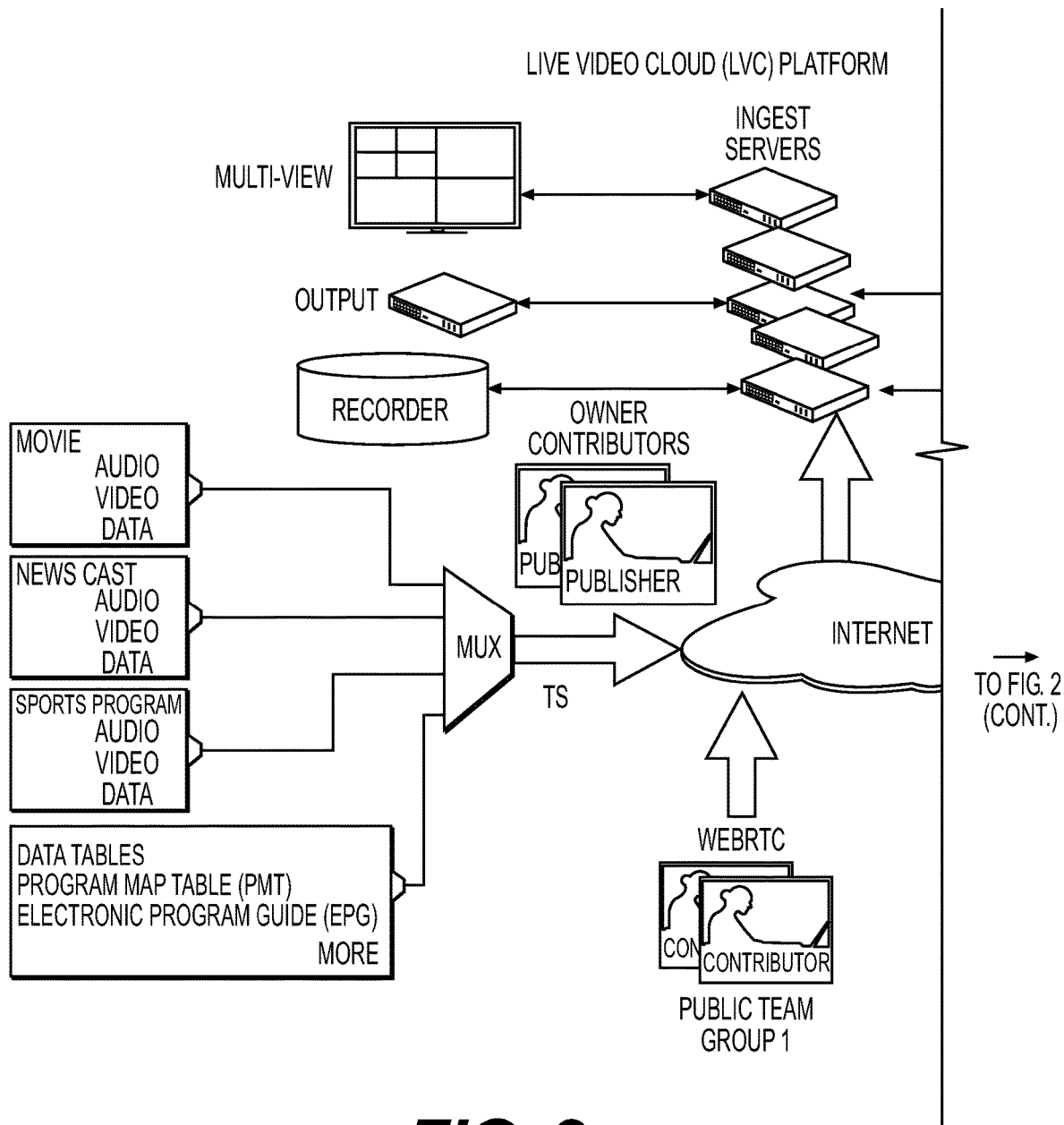
FIG. 2 shows implementation of the present invention in a Live Video Cloud (LVC) platform used for production, post-processing, and distribution of programs through streaming.
Figure 2:
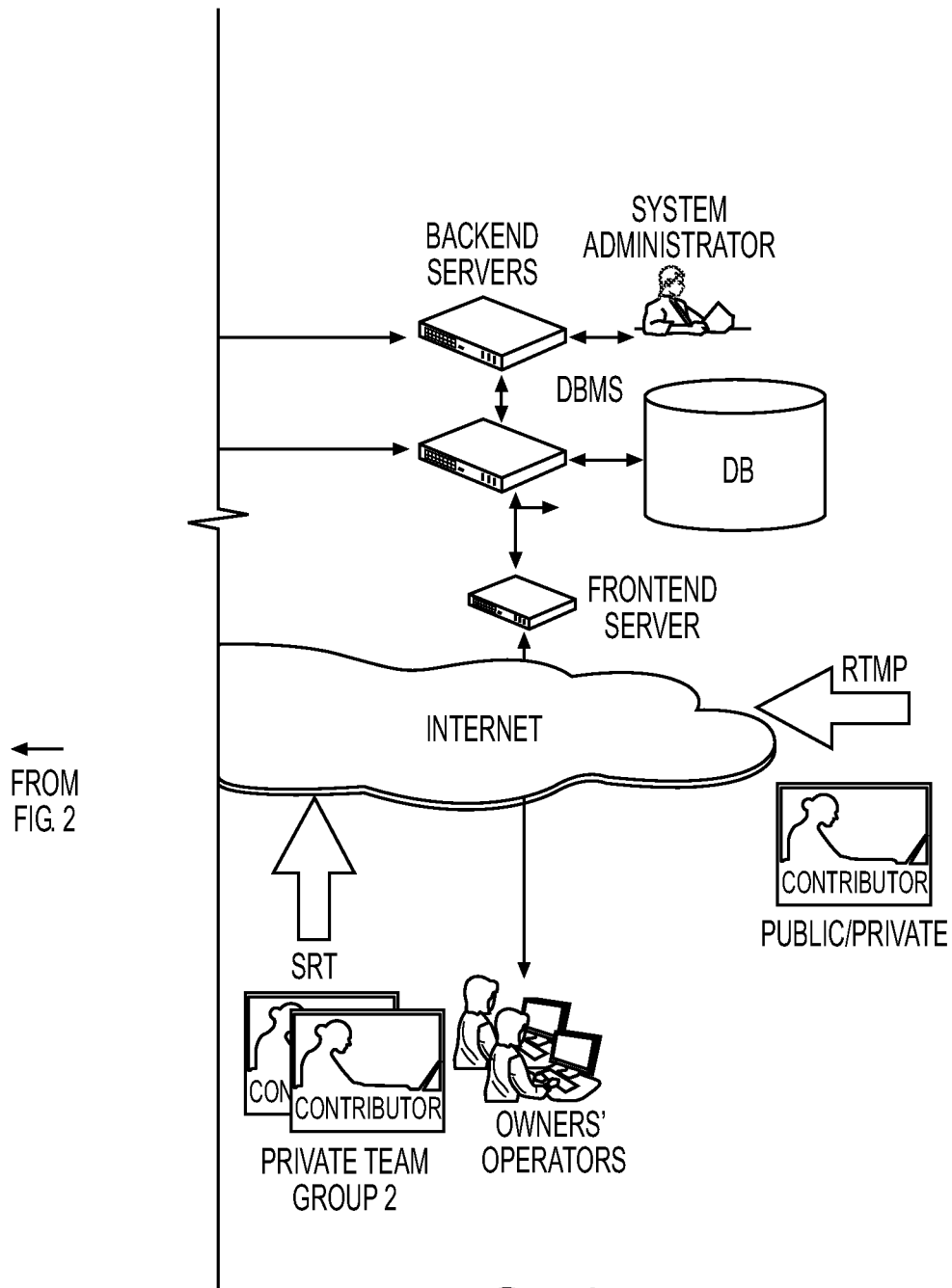

FIG. 2 shows implementation of the present invention in a Live Video Cloud (LVC) platform used for production, post-processing, and distribution of programs through streaming. The LVC uses servers that comprise processors, which process logical entities that represent various components used in production of programs. These logical entities allow the LVC to be scalable such that the processing power can be tailored to meet various production needs based on user defined parameters as further described below. The LVC platform is managed by a system administrator who controls databases as well as backend and frontend servers that form a database management system (DBMS) over a cloud computing network that includes the Internet. The LVC platform supports programmable streaming pipelines which allows for making flexible routing choices based on user defined parameters without changing the physical structure of the platform. In this way, the described LVC platform provides automated multi-media routing over various streaming formats, while supporting monitoring and alerting during production process in a scalable manner. The LVC can be used by production personnel, i.e., operators, assigned by owners or publishers of streams, who are given privileges to perform administrative function. The LVC is also used by contributors who are given privileges to contribute Signals used in programs, including owners or publishers of the programs. The administrative functions performed by the operators include creating such logical entities as Inputs, Streams, Routing and Outputs (as further described below) well as managing membership of contributors individually or in teams. Users of the LVC can be production personnel, i.e., operators, as well as contributors of Signals to the LVC. For example, an operator can be a company doing a production for the owner or publisher of a programs. Productions can be created by the operators. In the LVC platform, the operators can assign Inputs and Outputs to a Production. Productions are constructs that provide structure, filtering by assigning a set of Inputs and Outputs, and the ability to start/stop Inputs and Outputs.

As used in this specification, the terms "component," "system," "platform," "device," "entity" and the like can refer to a computer entity or an entity related to an operational machine with one or more specific functionalities, such as encoder or transcoder functionalities as well as logical entities like Input, Output, Program Transformation, and Routing. The entities disclosed herein can be either hardware, a combination of hardware and software, software, or software in execution. Logical entities as used herein represent functionalities consumed or produced by logical activities. They are a representation of real-world objects within the system and as such they have relationships with many other entities within the system. The attributes of the entities reflect their purpose and usage. For example, an entity or component may be, but is not limited to being, a process running on a processor, a processor, an object, an executable, a thread of execution, a program, and/or a computer. By way of illustration, both an application running on a server having processors and the server or a processor can be a component or an entity. One or more components or entities may reside within a process and/or thread of execution and a component may be localized on one computer or server and/or distributed between two or more computers or servers. Also, these components or entities can execute from various computer readable media having various data structures stored thereon. The components or entities may communicate via local and/or remote processes such as in accordance with a signal having one or more data packets (e.g., data from one component interacting with another component in a local system, distributed system, and/or across a network such as the Internet with other systems).

FIG. 2 shows Video Signals in various formats using different transport protocols, e.g., TS, WebRTC, RTMP and SRT, being routed as Streams to Ingest Servers over the Internet. As shown, teams of contributors contribute WebRTC and SRT Signals and a single contributor who is not part of the team contributes an RTMP Signals. A published or owner of a program can contribute Signals using TS protocol. The ingested Signals if accepted by a logically abstracted Input are abstracted as Streams before being sent to an abstracted Output defined as a logical entity. The Output can be mapped to a recorder device or to a multi-view device, which shows video images in what is known as tiles. In one routing example using MPEG-DASH over TS, the LVC identifies various audiovisual object types using a universal unique identifier system known as EIDR, which identifies assets, owners/publishers, titles, edits, and collections, series, seasons, episodes, and clips. The LVC supports Electronic Programming Guides (EPGs) and Interactive Programming Guides (IPGs). In this example, TS Streams that are routed to Ingest Servers include audio/video data and In-band (IB) metadata associated with movies, newscasts, TV and sport programs etc. There are several industry standards well known in the art such as ANSI SCTE 351, ANSI SCTE 1042, SMPTE 2010 and SMPTE 2038 that relate to in-band metadata signaling.

Also routed are Out-of-band (OOB) metadata, like PMT and EPG. Metadata can represent any kind of signaling data for example, signaling graphical overlays, tickers, events in programs (such as a goal scored in a soccer match), precise timing of events (e.g. start of a program, a chapter, an advert, an ad break, etc.), asset IDs (e.g. EIDR, Ad-ID), closed captions, statistical data about a program, e.g., a game, etc. Metadata can also be used to signal a scene's characteristics that could be recognized or otherwise measured based on some level of confidence, for example, using Artificial Intelligence (AI) or Machine Laming (ML). In one embodiment, AI/ML is used to recognize specified characteristics of audio/video data based on confidence levels. Once recognized, attributes or parameters associated with the specified characteristics can be used as metadata. For example, AI/ML can be used to analyze face of a person in a scene and generate metadata associated with confidence level for such analysis, e.g., a smiling face or frowning face etc.

Users of the LVC platform can access the platform through a portal provided by a frontend server at a URL, such as: www.livevideocloud.com, where users' log-in IDs and passwords can be entered. Once logged in, the web portal provides interfaces that enable the user/operators to configure various components of the LVC platform according to the present invention. One of the configurable entities of the platform is Input, which can be associated with one or more resulting Streams. Inputs are defined as persistent logical entities by users configured and managed via graphical user interfaces or Application Programing Interfaces (APIs). In one embodiment, Inputs exist until explicitly deleted via a manual action by the operators. In another embodiment, Inputs exist while there are no incoming Signals. In one example, Input may result in many Streams. Each Stream is associated with a session tag that creates a topical connection. Each session tag for Streams is created by owner/publisher of Stream, who has a unique identification (ID).

The operators manage Streams using administration interfaces provided by the frontend server. The DBSM manages acceptance or admission of contributed Signals and enriching and routing of admitted or accepted outgoing Streams. All incoming Signals are aggregated. Ingest servers and the operators determine which Signals are to be abstracted to logical Streams before being redistributed and/or recorded and which Signals are to be discarded without logical abstractions to Streams. The operators can collect recorded Streams in a "Media Mix" container, typically a ZIP container, for re-use. Re-uses can include, for example, downloaded archives, use with third party editors, watch on demand after recording, and so forth. For VOD, Ingest Servers read the recorded Streams from the Media Mix container and publish them to a content delivery network (CDN), which distributes them to viewers downstream.

For live video streaming, Ingest Servers allow the operators to manage accepted Streams and select the ones that are to be "on-air" based on configuration information retained by the DBMS, where the backend servers access the database to store and retrieve configuration parameters, IDs, attributes, predicates, routing rules, user profile data, etc. In this way, the operators can manage live sessions before accepted Streams are forwarded to Outputs for distribution. The frontend server displays all Inputs that are associated with a respective session tag to the operators, who can view and manage Stream acceptance and routing configuration parameters and user profiles, e.g., teams, groups, etc.

The backend servers enable the operators to assign available Inputs to start a broadcast and trigger recording of live Streams using interfaces provided by the frontend server. In this way, the operators can copy links or embed codes to sessions for distribution.

Figure 3:
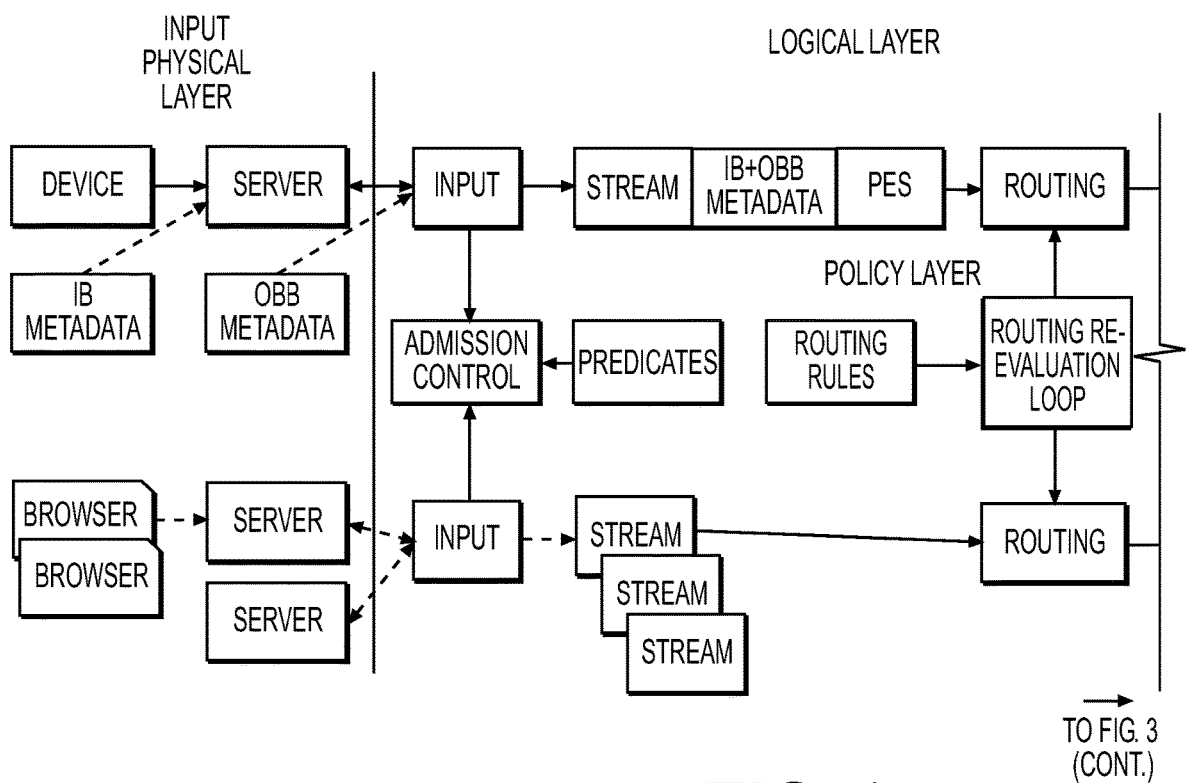
FIG. 3 shows a diagram that layers the physical and logical components of the LVC platform.
Figure 3:
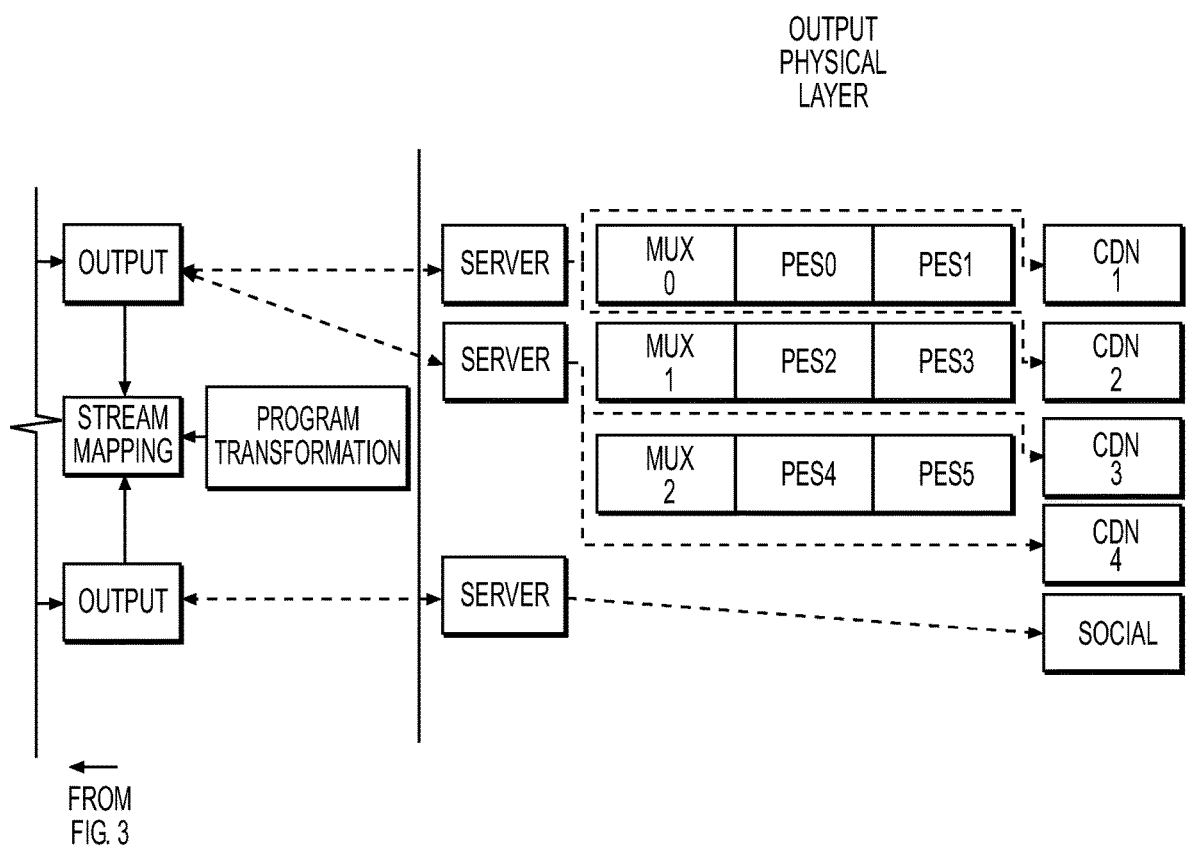
Figure 5:
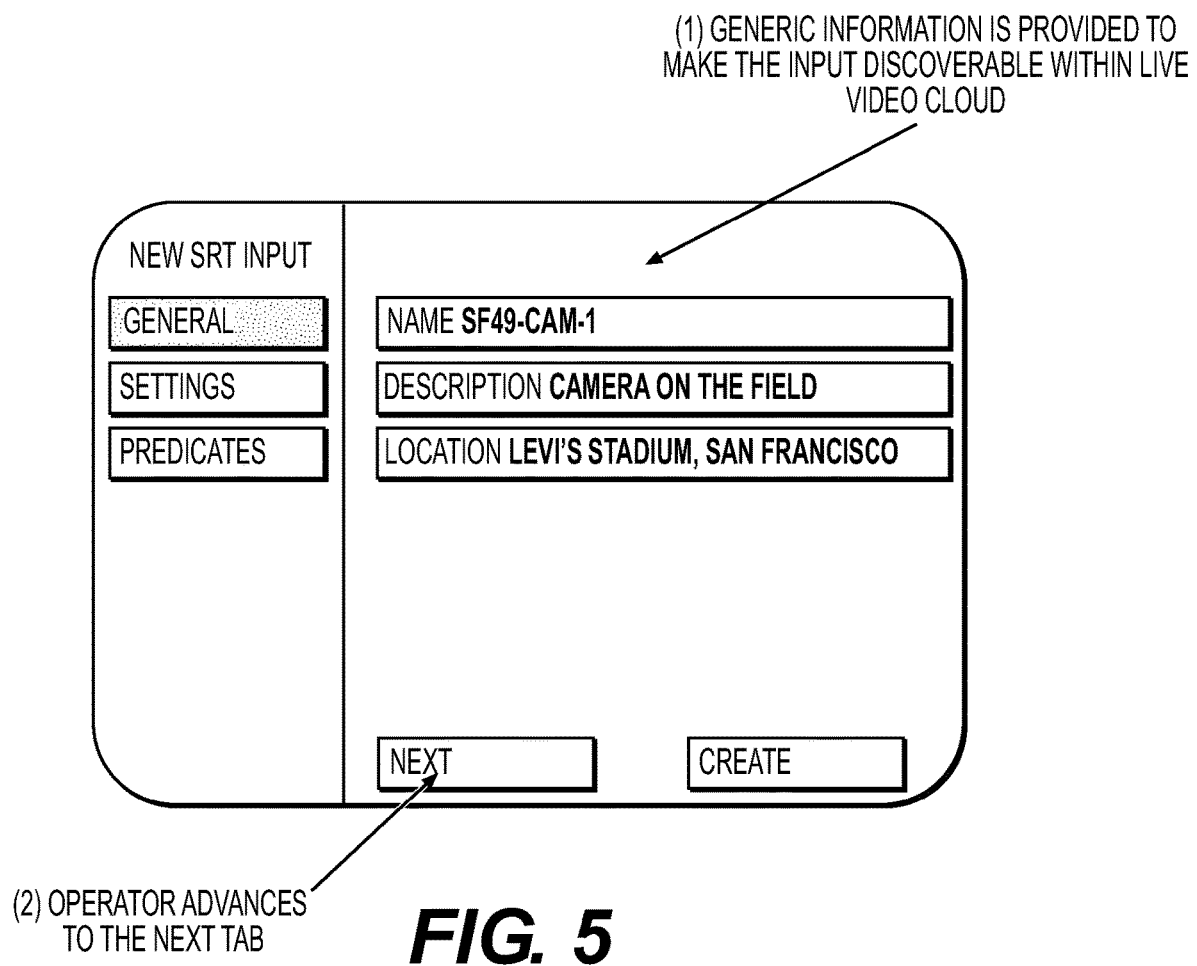
FIGS. 5-12 show the process for creating Inputs in the LVC platform according to the present invention, where.

FIG. 3 shows a diagram that layers the physical and logical components of the LVC platform by abstraction as a logical layer bounded by two physical layers, namely an input physical layer and an output physical layer. As shown, the input physical layer shows input Sources of Signals, such as multi-media signals originated at input hardware Devices and/or Web Browser applications running on computing devices. Sources are entities that provide Signals which are applied to servers. The input physical layer also provides raw contributed Signals with IB metadata and/or inserted OOB metadata to a logical layer implemented by the DBSM for processing which implements such components as Inputs, Streams, Outputs, Routing and Routing Rules as logical entities in the LVC. The Signals are applied to logical abstractions herein called Inputs. An admission control component in the policy layer acts as a filter for accepting or rejecting contributed Signals based on user defined predicates. A predicate is a logical expression which evaluates to TRUE or FALSE. The evaluation directs the execution logics in processing codes. For example, a contributed Signal is accepted if the logical expression is evaluated to be True. In the same example, a Signal is rejected if the logical expression is evaluated to be FALSE. In another example, an opposite logic may apply as further described below. Signals are logically abstracted as a Streams based on user defined predicates which are used to determine if a Signal is rejected or accepted. Only accepted Signals are abstracted as Streams and rejected Signals are discarded without abstraction. The Streams are associated with IB/OOB metadata as well as Packetized Elementary Stream (PES), which is a specification in the MPEG-2 (ISO/IEC 13818-1) and ITU-T H.222.0. PES defines carrying of elementary streams (usually the output of an audio or video encoder) in packets within MPEG program streams and MPEG transport streams. The elementary stream is packetized by encapsulating sequential data bytes from the elementary stream inside PES packet headers.

Streams representing accepted signals, i.e., accepted Streams, are subject to Routing based on Routing Rules that are part of a policy layer. In addition to Predicates, the policy layer implements other user defined parameters, including Routing Rules, and Program Transformation. The Routing Rules can take into account IB/OOB metadata during streaming before the logic layer routes the accepted Streams to an Output. Routings of the accepted Streams are created based on re-evaluation by a Routing Re-evaluation Loop. The Routings are based on user defined Routing Rules before the accepted Streams are routed to Outputs.

Outputs may select a subset of the PES within the underlying physical transport based on user defined Program Transformations. Each Program Transformation comprises logical rules associated with an Output which are evaluated when a multiplex of a Stream is generated. Program Transformation uses Program-specific information (PSI) containing metadata about a program. PSI includes PAT (Program Association Table) and PMT (Program Mapping Table) among others. A PMT defines a program by specifying multiple PES by their PID. For instance, the PMT may reference the PES at PID 100 for video and PID 101 for audio. One MPEG Signal may contain many PMTs which are listed in the PAT. According to the present invention, Program Transformations select an accepted Stream ahead of time or just in time. For instance, the program transformation FIRST_VIDEO to PID 100 selects the first video just-in-time when a Program Mapping Table (PMT) is made available and distributes the first PES carrying a video signal on PID 100. Logical Outputs are processed by one or ore more processing units or processors, such as those used in one or more servers, in the output physical layer using logical rules associated with Outputs which are evaluated when a multiplex of a Stream is generated. The servers provide Signals that contain multiplex and PES for use by Content Delivery Networks (CDNs 1-4) or a Social Network.

FIG. 4 shows a functional block diagram for attributes of a logical entity defined as an Input, including the owner of a Signal that is abstracted by the Input, End Points, Routing Rules, Predicates, State and Metadata. Inputs have states such as online, offline, error, unknown, etc. In one example, the Source can be a device an encoder, a web browser that contributes Signals via a public or private WebRTC or a transcoder. A Stream is representation of an accepted Signal that is active and identifiable by the Stream. Streams exist while accepted Signals are active. A Target/Destination is an entity that a Stream or Streams can be Routed to. Target/Destination can be an Output, a transcoder, a recorder with an inlet for receiving Stream or Streams. Target/destination can have an inlet for Streams used for multiple viewing. Target/destination can also be an Output, a transcoder or a recorder.

The output of Source can be Input to a component of the LVC platform. Input can be viewed as implemented in the logic layer shown in FIG. 3. The LVC supports two types of Inputs: "push" Input and "pull" Input. A push Input listens for connections and let pushing Signals into the LVC platform. A pull Input requires active connection to Sources and pulls Signals into the LVC. Examples of Inputs are:

Pull HLS, MP4
Pull Images (Slate, Overlay)
Push SRT
Push RTMP
Push HLS

In one embodiment, Inputs are managed based on types by either an operator or a team/group of operators, but not both. Certain Input types may not be managed. In one example, Inputs provides one or more URLs to which a Device (encoder, software, browser, etc.) can connect at Endpoints. An Endpoint is one end of a communication channel usually represented by the URL of a server or service. Endpoints become invalid when Inputs are switched off. Endpoints have a Time to Live (TTL) after which they expire. TTL may be implemented as a counter or timestamp that prevent packets from circulating indefinitely. TTL is not applied to certain Inputs such as stable RTMP, push URLs or hardware encoders. Endpoints can be dynamic in that they may not be known ahead of time. For example, an Input can generate Endpoints dynamically upon request.

An Input can have one or more predicates. Predicates are functions in the form of ƒ(Input, stream) Boolean (true or false). In one example, an Input does not accept a contributed Signal if any predicate is FALSE. In this example, Input accepts the contributed Signal only if all predicates are TRUE. Predicates can be configured by the operators via the user interface provided by the web portal or an API. For example, functions may be configured by operators so that: "Signals can be accepted during a certain time of day", "Signals can be accepted if originated with a geofence or within a zone or location" or "Signals from a specific IP address can be accepted," etc.

The function geofence: (lat, lng, d)→ (Input, stream)→Boolean is a function producing predicates for a given latitude, longitude and distance. The function may be used to evaluate metadata of contributed Signals accordingly and reject all Signals that are not in proximity of a specific point of interest. If Predicates are FALSE, a Signal is dropped from Ingest without being abstracted as a Stream. The LVC platform may create predicates for internal use by the system administrator. For instance, the incoming connections for an Input can be limited using an internal predicate that allows only up to a maximum of N connections.

The LVC platform supports user defined and automated Routings of routable entities, which adhere to various routing protocols. A Routing establishes a connection between an accepted Stream (or it's actual video Source) and a Target. Target is valid as long as Stream is valid. More specifically, Inputs can be routed based on a user defined Routing Rules. A Routing Rule is a definition attached to an Input, which is evaluated when a contributed Signal appears at the Input. The Routing Rules are re-evaluated periodically (e.g., each second) to determine the state of Streams. Routing Rules of an Input are re-evaluated when predicates change.

User defined Routing Rules can be used to define a desired setup, such as:
"Switch from on-demand loop to live at 19:30"
"Drop Stream if less than 10 mbit/s"
"Record incoming Streams when not in business hours"
"Route streams from Input A always to Output B"

When Routing a Stream representing an accepted Signal, a connection can be established over a communication channel between a Source and a Target as long as the accepted Signal exists. Streams can represent accepted Signals comprising conventional video, compressed data streams or data files as well as IB metadata sent with other components of the audiovisual content (video, audio, closed captions etc.). Inputs can define additional metadata attached to accepted Streams upon creation or definition as logical entities by the operators. Because metadata can change over time, Streams are re-evaluated when their metadata changes. In one embodiment, changes in states of Inputs also cause re-evaluation of routing relations.

Input Creation

Figure 6:
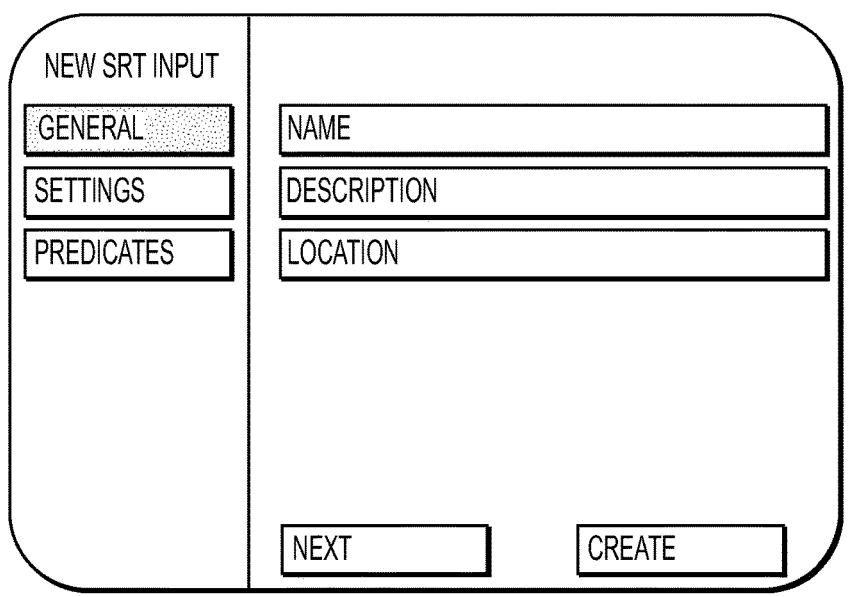
Figure 7:
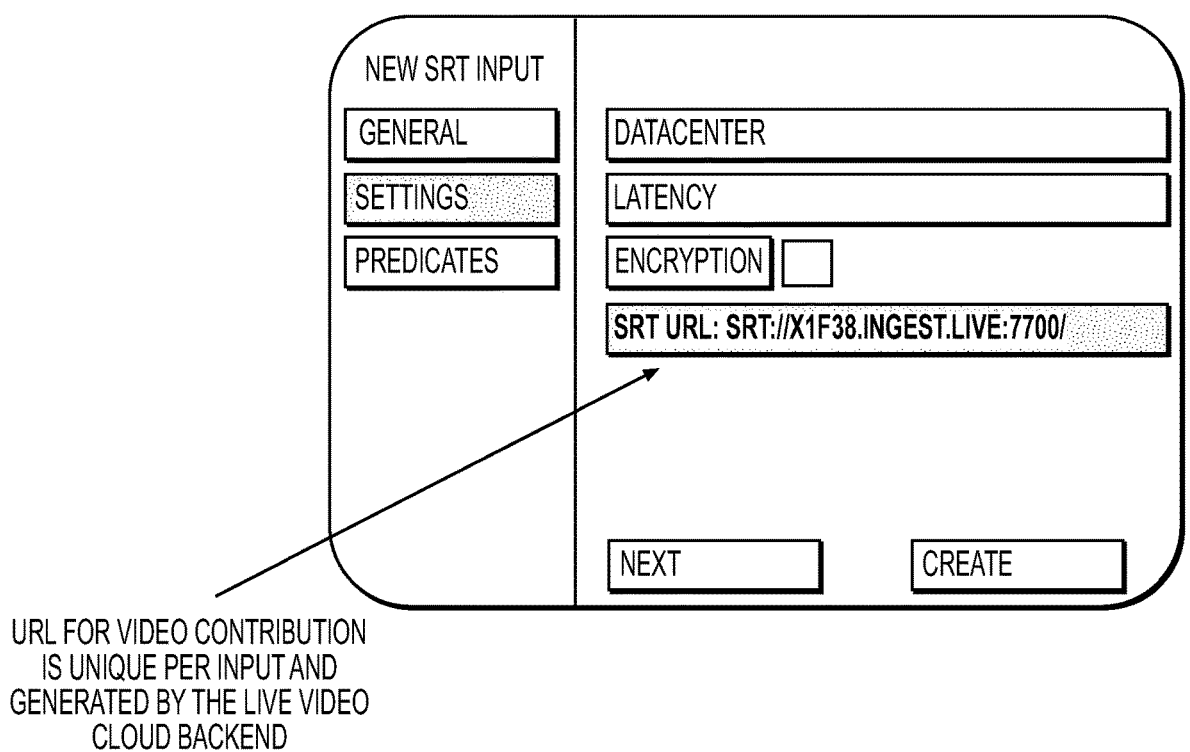
Figure 8:
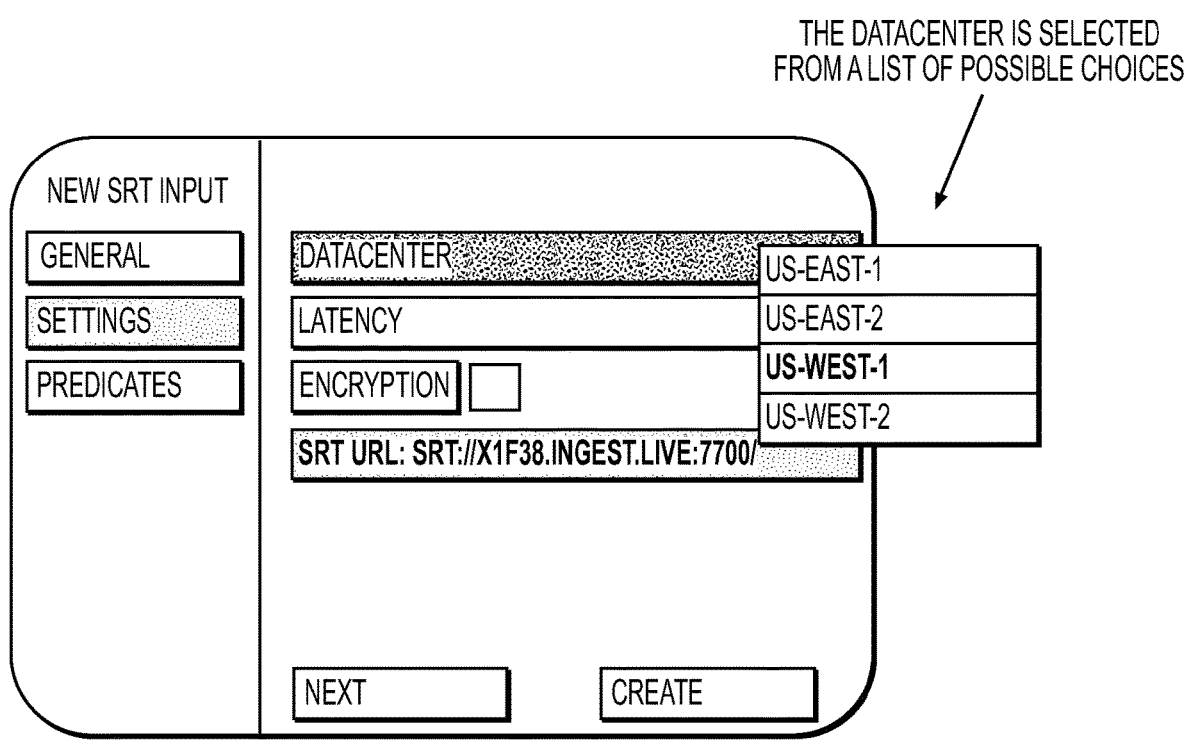
Figure 9:
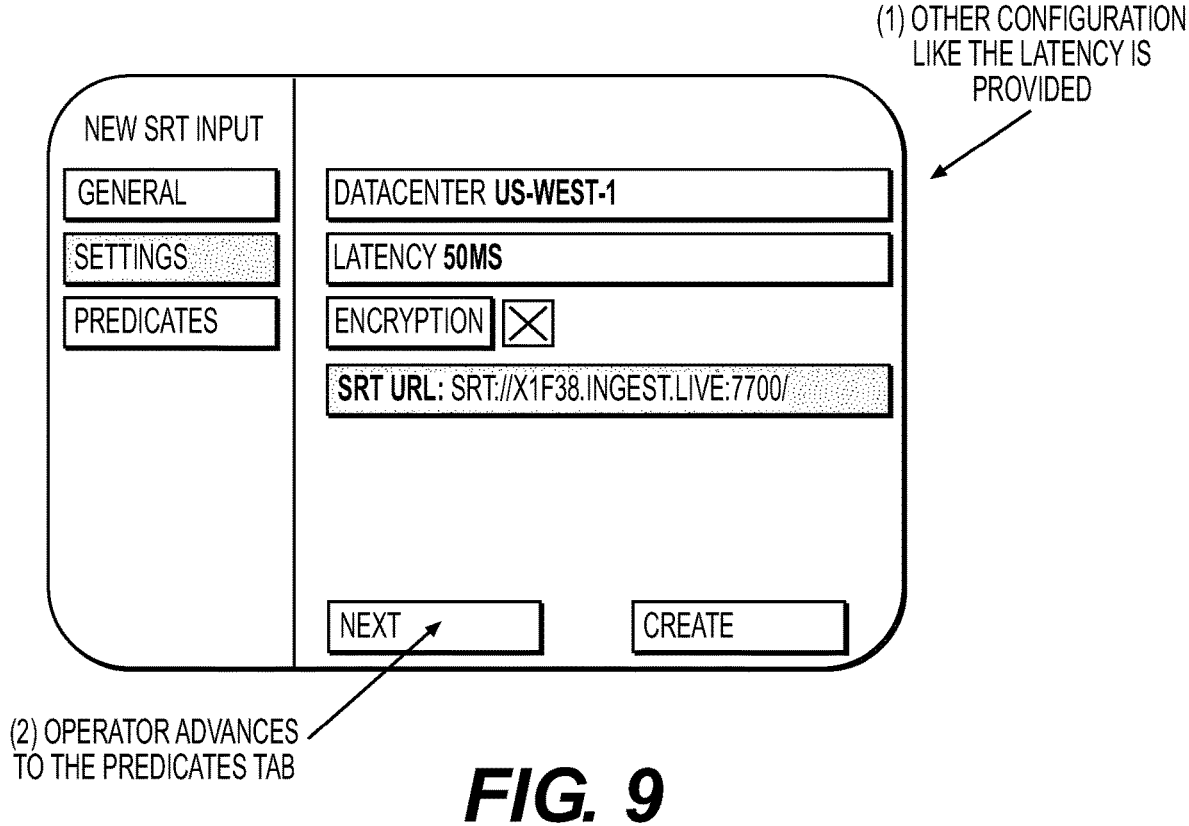
Figure 10:
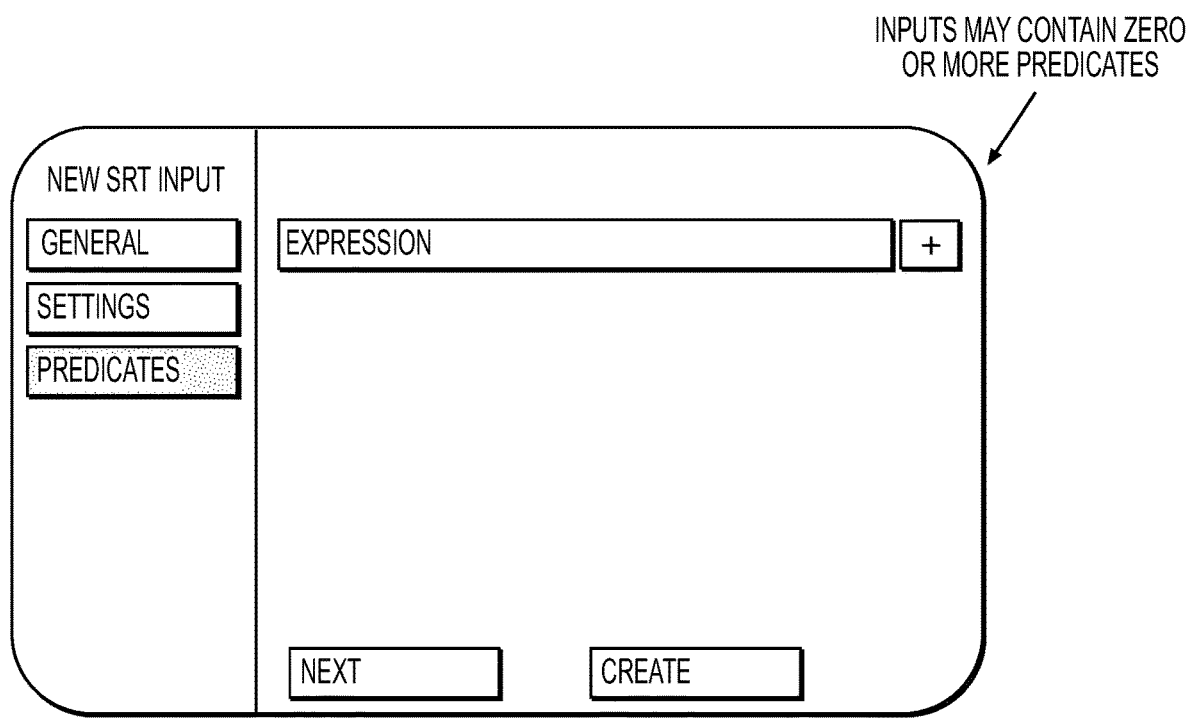
Figure 11:
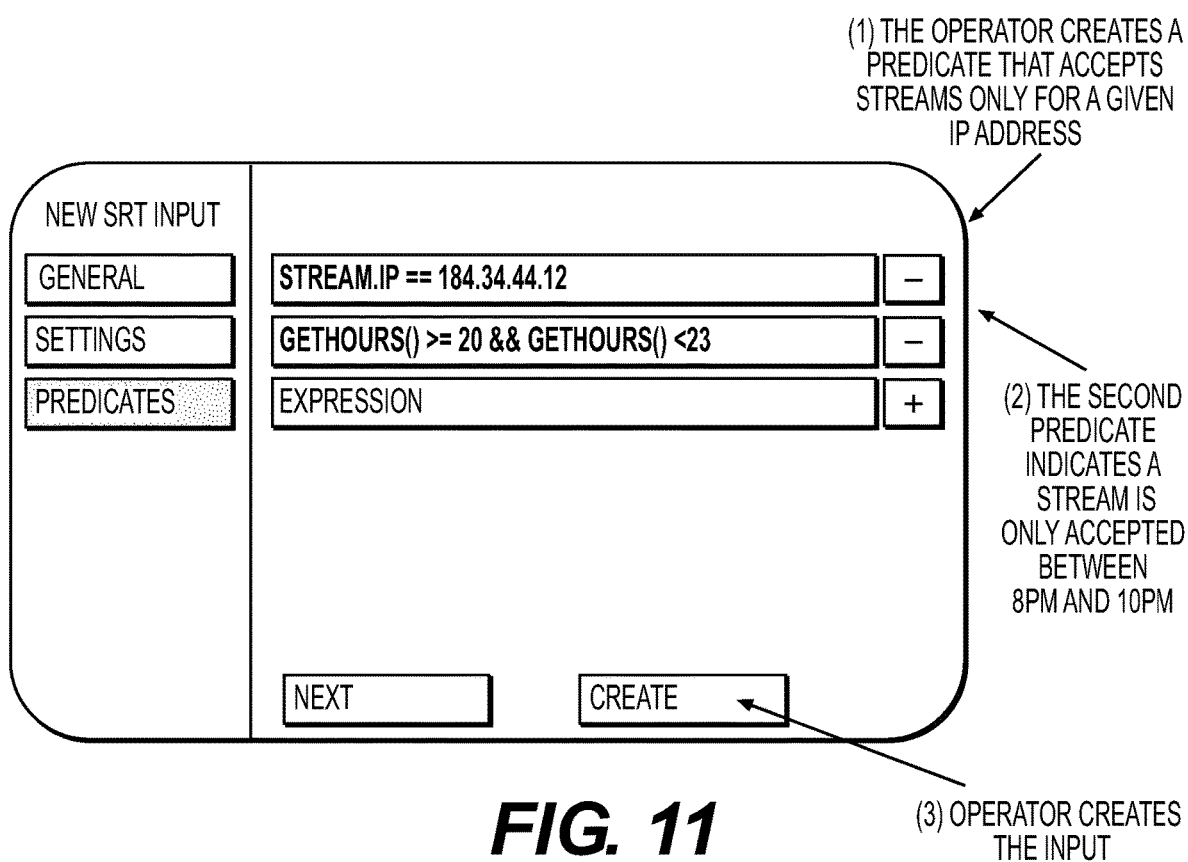

FIGS. 5-12 show the process for creating Inputs in the LVC platform according to the present invention. The process begins in FIG. 5, when an operator who logs into the LVC platform shown in FIG. 2 selects an Input tab (not shown) via a user interface. Within the Input tab, the operator clicks on "New Input," which presents a list of available Inputs such as Stream tag, RTMP Push, or SRT Push. In this example, the operator selects SRT Push. A configuration wizard that contains two tabs, namely "General" and "Setting", is presented to the operator. FIG. 6 shows selection of the "General" tab, which allows the operator to enter generic information that would make the Input discoverable within the LVC platform. FIG. 7 shows selection of the "Setting" tab, which contains SRT Push specific settings. The LVC platform generates a URL for contributed Signal, which is unique to each Input. FIG. 8 shows a selected datacenter from a list where the URL is served from. FIG. 9 shows other configurations like the latency, which in this example is set at 50 ms. FIG. 10 shows the predicates. Each Input may contain zero or more predicates. FIG. 11 shows creating a first predicate that accepts Streams only from a given IP address and a second predicate that requires the Streams to be accepted between 8 pm and 10 pm. As shown in FIG. 12, when the operator clicks the 'Create' button, the LVC makes a request to relevant API to create a record for the created Input in the DBSM.

Output Creation

Outputs are the destinations of Streams. They are logical entities that may refer to one or more physical servers and many potential destinations like social websites or content delivery networks (CDNs) as explained in connection with FIG. 3. The physical destinations are grouped within one Output so that the same video processing, like standards conversion, may be applied to the Video Signal. Outputs may contain one or more Program Transformation. Program Transformations may be specified individually for each Target/Destination. Before generating a multiplex for a specific destination, the incoming PES as specified within the PMT are selected and assigned a specific Packet Identifier (PID). A user may therefore select which destination receives which specific set of Streams within one transport Stream. For example, a destination may receive the audio track for one language whereas another destination may receive audio for a different language. FIGS. 13-18 show the process for creating Outputs in the LVC platform according to the present invention. FIG. 13, shows a portal for creating Output via a user interface, where a user can create a new Output from a list of different Outputs, such as Transcoded or Passthrough Outputs. In FIG. 13, the user selects to create a Passthrough Output. FIG. 14 shows selection of the "General" tab, which allows the operator to enter generic information that would make the Output discoverable within the LVC platform. FIG. 15 shows selection of the "Setting" tab, which allows a user to set a delay, frame rate resolution as well as interlacing mode.

Program Transformations

FIG. 16 shows selection of the "Program Transformations" tab, which allows an operator/user to set Transformation parameters. The operator may specify program transformations for the output as a whole or individually for each destination. Program Transformations are individual rules applied to the PES within one PMT. They select a PES either known ahead of time or just in time. Program Transformations have a mode that is either "absolute", "relative" or "any" and an action that is either "absolute", "keep" or "drop".

Program Transformations that are absolute and any are known ahead of time as they do not pose a requirement of knowledge to a PMT. The absolute rule selects a PES by its PID. The any rule selects any PES. Relative rules have the form n-th of a kind, like "first video" or "second audio". These rules select the n-th PES of a time as it appears within the PMT. Relative rules require therefore the presence of a transport stream with a PMT to be evaluated.

Program Transformations can only be resolved and evaluated once a Stream is available. It is impossible to know whether two Program Transformations have a conflict since the presence of all PESs is only known once a PMT is known. However, an operator may define conflicting rules on purpose to normalize different Streams. The rule PID 100 to PID 100 and PID 101 to PID 100 would normalize any Stream that has a packetized elementary stream defined for either PID 100 or PID 101 and make this feed available on PID 100. Such a rule would only pose a conflict if a Source would advertise both PID 100 and PID 101. Program Transformations can therefore only be evaluated and realized once a Stream is routed to an Output and multiplexed for its destination.

Program Transformations are evaluated in an order from most specific to least specific. Absolute transformations are evaluated before relative transformations, which are evaluated before any transformations. Within these categories the transformations are evaluated based on their action from more specific, being absolute, to less specific, being drop. Program Transformations are materialized once a PMT is known. In this process, all relative Transformations become absolute by selecting the PES for the n-th index in a relative Transformation. Once all absolute Transformations are known conflict resolution may occur. In this process mappings that are effectively the same (PID 100 to PID 100 and FIRST_VIDEO to PID 100 whereas FIRST_VIDEO is at PID 100) are merged where conflicting actions choose the positive outcome (keep wins over drop) and otherwise conflicting mappings are reported as an error to the user (for example, the mappings PID 100 to PID 200 and PID 101 to PID 200 are conflicting if both PID 100 and PID 200 exist in the Video Signal). In one embodiment, Program Transformation parameters are user defined according to requirements of a program under production using the LVC.

Latency

Distributed systems that abstract the underlying infrastructure may induce additional latency to the user of the system. The professional distribution of Signals requires these Signal to be delivered at a constant bitrate so that the receiving hardware decoders do not fail by, for instance, receiving too many packets within an instant that would overflow an internal buffer and therefore dropping packets which will result ultimately in packet loss and visual artifacts. Distributing signals over wide area networks requires typically a form of buffering so that the packets which are received may be paced at a constant discrete time interval. Without such a buffer any party forwarding a signal would only be able to forward a signal at the pace it is receiving the signal which is subject to network jitter. The size of the packet buffer translates to a linear increase in latency. Adding any additional server within a signal flow would therefore add to the perceived latency of a signal which is undesirable. LVC does not require buffering as necessary for achieving a constant bitrate up until the Output is sending a signal to its final destination. The inter arrival time (IAT) of packets is recorded at the ingest server and preserved throughout the system up until the Output. At this point the IAT of the individual packets may be reproduced since it was stored as additional metadata with the packets of the transport stream.

FIGS. 17 and 18 shows selection of the "Destination" tab, which allows a user to set destination parameters. FIG. 17 shows specifying multiple destinations, e.g., RTMP and SRT destinations. The same Stream routed to the Output is multiplexed to these destinations. FIG. 18 show that when the Operator clicks the 'Create' button the Live Video Cloud UI makes a request to the Live Video Cloud API to persist the Output record in the database. The Live Video Cloud API validates the data for correctness and persists a valid Output in the database with records that have unique identifiers for the created outputs.

Streams

FIG. 19 shows attributes that define Streams. A Stream can be associated with an accepted Video Signal, referenced by an identified URL, as well as metadata. The metadata can be part of the Stream (i.e., IB metadata) or provided from a different Source, where other components of the system can read a Stream metadata without knowledge of binary format of a used video codec like H.264. When an external entity pushes Video Signal into the LVC, or when Video Signals are pulled by the LVC, contributed Signals are accepted based on admission control predicates of Inputs. Only accepted Signals are abstracted as Streams, which exist as long as the connection is established, stable and valid based on re-evaluation of the predicates.

Streams also contain a session identifier used to identify contributed Signals of the same publisher or owner during reconnects. As stared above, universally unique identifiers (UUIDs) are used to identify contributed Streams by publishers, owners and other types of public or private contributors. The session identifier can be defined and/or created by an Input or can be given during validation by an Ingest Server. Pull Inputs generate the session identifier by themselves.

For example, $User_A$ opens the landing page for a public WebRTC push Input, a session ID is assigned to the WebRTC Stream. In this example, $User_A$ is contributor of WebRTC Stream, which can for example be an accepted Video Signal showing the contributor. The LVC platform tracks the session ID until $Stream_{A1}$ is associated with an Input, which is configured by an operator to Route $Stream_{A1}$ to $Output_1$. $User_A$ experiences a short connection loss and the stream is terminated. A browser client can re-establish the connection, resulting in a new stream $Stream_{A2}$. Since the session ID is stable across reconnects, the routing relation to $Output_1$ can be evaluated and $Stream_{A2}$ will be routed to the $Output_1$.

One Stream can reference one Input and multiple Streams can reference the same Input. Each Stream defines at least one Stream URL, but there can be more than one URL for a Stream. Stream URLs have a mime-type attribute. There can be more than one Stream URL for the same mime-type. Below is implementation for two use case examples:

Use-Case (i): The stream URLs rtmp://ingest.live/_/X123ZW as well as https://ingest.live/_/X123ZW/thumbnail.jpg might exist for the same Stream. One for a live Video Signal and the other for preview thumbnails.

Use-Case (ii): The stream URLs rtmp://ingest-af123h.smt-services.com/_/X123ZW as well as rtmp://ingest-bfdh71.smt-services.com/_/X123ZW might exist for the same Stream, where on Steam can be the backup for the same Stream.

The identity of publisher/owner of a contributed Stream corresponding to an accepted Signal can be known. If the publisher is known, a valid and unique publisher/owner ID is referenced in the DBMS. Some contributors of Streams may be unknown.

A Stream corresponding to an accepted Signal contains additional metadata like it's audio and video codec, framerate and possibly a location. This metadata can change over the lifetime of the Stream and is stored with a timestamp relative to the creation of the stream in the DBMS. Metadata changes can be incremental. That is, when the value of metadata $key_x$ changes at one point in time t, for different metadata—e.g. $key_y$, $key_z$,—the latest value is considered present at t. For example, it may be desirable to store tuple (latitude, longitude) at t+0 s, at t+5 s, . . . , t+Ns. Or it may be desirable to store confidence scores from an AI/ML system. However, changing these values doesn't mean the other metadata that was previously present is lost, like the video codec.

Routing Rules

FIG. 20 shows implementation of Routing Rules. Routing Rules define rules applied once a contributed Signal is accepted and abstracted as a Stream. A Routing Rule can cause multiple Routings Rules based on corresponding predicates. Multiple Routing Rules for the same Target can be applied to a single Input. A Routing Rule can be considered as a function $f(Stream) \rightarrow Routing$, which results in a Routing for a given Stream abstracted for an accepted Signal. Routing Rules bring about the desired state of the physical routings that should be manifested by enforcing the policy layer shown in FIG. 3. For Routings, each Source can be uniquely identifiable. Multiple Routing Rules can reference the same Source. In one embodiment, Routing Rules reference Targets. One Routing Rule can contain many predicates. As stated above, the predicates are functions of the form ƒ(rule, stream)→Boolean (TRUE or FALSE). The Routing Rules do not produce Routings if any predicate's specified Boolean condition (TRUE or FALSE) is not satisfied Routings FIG. 21 shows Routing when connecting a Source of a Stream to a Target. In one example, the Target is an arbitrary location within or outside of the LVC platform, but not necessarily an Output. For example, the Target may be a component that records accepted Streams or enriches a Stream based on metadata, for example, Routing based on AI/ML determined parameters, such as analysis of confidence levels in defined characteristics of Streams.

While Sources of Signals can be Ingest Servers, Targets may be Output, tiler engines, switches, routers or internal nodes, like a recorder. Routings can be created automatically when Streams appear. Routings can also be created by components in the LVC platform. In one embodiment, Outputs are immutable, i.e., they do not get updated after creation. Routings can be edited or deleted by a user after creation.

Routings reference Sources with unique identifiers of Streams or internal or external URLs. For example, Source Stream UUID//95ac51c7-9af1-497b-b542-07be6458b071 or Source URL rtmp://ingest.live/_/ABC123. Routings also reference a determinable Target with a unique identifier or a URL. For example, Target UUID//95ac51c7-9af1-497b-b542-07be6458b071 or Target videoengine://23ac51c7-9a11-497b-b542-07be6458b071, which can for example be a tiler Target for Source Stream UUID//95ac51c7-9af1-497b-b542-07be6458b071.

Resolving Routings

According to one embodiment, Routings are resolved by resolving Sources and Targets. A Source reference can for example be resolvable to a URL or an Ingest Server. For example, Streams UUIDs can be ultimately resolvable to the URL or the Ingest server. A URL is already considered a resolved Source. A Target reference is also resolvable to a URL. UUIDs are ultimately resolvable to:

The URL of a Video Engine's API Endpoint, if the Video Engine is referenced.

The URL of a Production API if Production of a program is referenced.

The URL of an Output API if the Output is referenced.

Routing Targets can reference a Production, which can change during the lifetime of Routings.

Example: $Output_{foo}$ can Reference $Production_{foo}$ as Long as it is Attached to that Production Routing Types Streams can be routed to Targets once they appear. An example for such Routing is a Stream that is routed to a tiler (Selector) application when it appears first. An operator may define automation for routings based on a criterion. The DBMS will evaluate whether or not a Stream matches the criteria and creates a Routing to a Target, which may be dynamically chosen.

In one example, $Stream_B$ is defined as a backup for $Stream_A$. Once $Stream_A$ ceases to exist for example, due to a connection loss, $Stream_B$ is automatically routed to Target of $Stream_A$. Another example could be an operator define a rule to route the Stream with the highest confidence score for a metadata derived from applying AI/ML, such as a keyword like "smile". Applying AI/ML facial recognition, metadata from a stream that contains a confidence score for features of a face (e.g., smiling) is used for Routing based on whether the confidence passes a threshold.

The operators can also Route Streams to Targets by performing actions via the graphical user interface (or using an LVC API). In one embodiment, the operator selects a Stream and routs it to an Output using a presented user interface.

Routing Protocol

Targets implement Routing protocols. A Target may also be a Source. For example, the routing protocol defined using gRPC is as follows:

```
service Routing Target {
    // Connect a Source to this Target.
    //
    // Implementations MUST be idempotent. If the stream is
    // already connected to this Target, the request is simply ignored
    // and the existing token returned.
    //
    // The Target MAY disconnect any stream for the same stream_session_id.
    // Note that this is only appropriate for Targets accepting exactly one Input.
    //
    rpc Connect (ConnectRequest) returns (ConnectResponse);
    // Disconnect a Source from this Target.
    rpc Disconnect (DisconnectRequest) returns (DisconnectResponse);
}
message ConnectRequest {
    string routing_id = 1;        // unique identifier of the routing
    string Source_url = 2;        // resolved url of the Source
    string stream_session_id = 3; // unique session identifier of the stream
}
message ConnectResponse {
    string token = 1;                   // arbitrary token to identify the established connection
    repeated string disconnects = 2;    // list of disconnects (each a token) due to the newly
                                        // established connection
}
message DisconnectRequest {
    string token = 1;        // must match the token given by a connect response
}
message DisconnectResponse { }
```

Routings and Routing Rules

When a Stream is Routed to an Output by an operator, a Routing Rule is entered from Input to Output for the Stream's unique session identifier. There is not more than one Routing Rule for an Output Target. There can be multiple Routing Rules to different Outputs. However, there is no more than one Routing Rule for the same Source→Target relation. When creating a new Routing Rule for any Target, the existing Routing Rule, for example, from a different Input, is removed.

Routing Rule Evaluation and Re-Evaluation

Evaluating Routing Rules can involve testing for all predicates, building a set of Targets for a given Routing Rule and mapping Targets to associated Routing. Routing Rules are evaluated when any Routing Rule, Target of a Routing Rule or an Input is created, updated or deleted regardless of the state of the Input (online or offline for instance). Re-evaluation can occur when:
  (1) a referenced Target of a Production changes;
  (2) a referenced Target is updated or deleted;
  (3) preconditions of a routing relation changes;
  (4) preconditions of an Input changes;
  (5) the state of an Input changes;
  (6) routing rules are added to an Input; and
  (7) routing rules are removed from an Input.

If one Stream $s_{exp}$ is routed to the Output $o_{exp}$ by an operator, the associated Routing Rule becomes (stream=$s_{exp}$, Target=Output://$o_{exp}$) for the associated Input. If the operator decides to move the Input to a different production $P_{new}$, the Input is removed from $P_{old}$. This action results in the re-evaluation of all routing rules for the Input. The DBMS will therefore perform a reevaluation of the current Routings and evaluation of new Routings by performing the following:
  1. Apply the change to Routing Rules, remove $P_{old}$, add $P_{new}$
  2. Load all current Routings for the Input and context, and reference the Routings $R_{old}$
  3. Evaluate all remaining routing relations, if the Input state is online, and call the resulting set of Routings $R_{old} \cap R_{new}$ equals { } if the Input is offline
  4. The Routings in the intersection $R_{old} \cap R_{new}$ can be ignored
  5. Each Routing in the difference set $R_{old} \setminus R_{new}$, the set of all Routings that are in $R_{old}$ but not in $R_{new}$, will be deleted
  6. Each Routing in the difference set $R_{new} \setminus R_{old}$, the set of all Routings that are in $R_{new}$ but not in $R_{old}$, will be created
  7. Routings that don't have context information are not changed.

Effectively Routing Rule (Stream=$s_{exp}$,Target=Output://$o_{exp}$) would be deleted first, because the Output has a relation to the Production. But the Production is no longer in the list of Routing Rules. All Routings that are no longer valid, e.g. a Routing that resulted from the rule for the Output is disconnected. Finally, new Routings, e.g. to a new tiler can be created.

The following re-evaluation algorithm can be used to map from the current state or Routings to the desired state of Routings:
  (1) Build set of referenced Productions from the rules that have a Production as a Target
  (2) Fetch all Streams for the Input under re-evaluation
  (3) Match each Stream against Input's predicates and dismiss those that don't match
  (4) Remove all rules that have a Production reference that isn't in the set from (1)
  (5) Fetch all Routings that reference the Input and have a context that is in the set from (1)
  (6) Build the set of new Routings by evaluating each rule for each Stream given the Input is online; If the Input is not online, an empty set is used.
  (7) Disconnect all Routings that are in the set from (5) but not in (6)
  (8) Connect all Routings that are in the set from (6) but not in (5)

Routing Management Example

For this example, the following criterion are assumed:
  (1) $Input_A$ has a rule to Route accepted Streams to $Production_A$
  (2) $Production_A$ creates Routings for incoming connections to $Tiler_A$
  (3) Re-Evaluation occurs In this example, implicit Routings for any incoming Stream to $Production_A$ are created based on criteria (1). These Routings will receive the UUID of $Production_A$ as their context. When the Stream is routed to $Production_A$, a service receiving the routing will create a new routing for the Stream to $Tiler_A$ based on criteria (2). No context information is attached as the Routing is no longer a Routing because it is not created by an Input.

Then re-evaluation occurs based on criteria (3). Once re-evaluation occurs, corresponding Routings from Production to tiler are removed when they are removed from the Production. No Routing to the tiler is removed if the corresponding Routing stays active for the Production by ignoring the Routings created by the Production to the tiler. The Routings that are not directly created by the Input are ignored during re-evaluation. Instead, it is assumed that the service handling the Routings for the Production is also disconnecting corresponding Streams from the tiler when the service determines that a Stream is disconnected. On the other hand, connect is an idempotent operation, i.e., an operation that can be executed an unlimited number of times and the state will be the same, and therefore would not create the same Routing twice.

Routing Rule of Target can reference a Production indirectly. This reference can change during the lifetime of the routing rule.

Example: The $Output_{foo}$ References the $Production_{foo}$ as Long as it is Attached to that Production and the $Routing\_Rule_{production}$ Becomes Associated with $Production_{foo}$ In one embodiment, the LVC platform supports the following non-exhaustive Input type examples:
  1: RTMP Push Input;
  2: Public/Private WebRTC Push;
  3: HLS Pull RTMP Push Input defines an Endpoint known ahead of time for a single contributed Stream under a 1:1 relationship. The Endpoint has a form like rtmp://ingest.live/i/XYZ123. RTMP Push Input can be an external Device owned by either a user or a team. RTMP Push Inputs do not allow Streams to replace the current Video Signal if a Stream is currently considered active for the same session ID. For example, RTMP Push Inputs can support predicates for accepting a Signal based on an IP range.

Public WebRTC Push can define both a WebRTC Endpoint as well as a landing page which contributors can use to start streaming, for example, under a 1: N relationship as the associated Input could result in many Streams. Public WebRTC Inputs can be owned by a team of contributors, but not a single contributor. In one embodiment, Public WebRTC Inputs support predicates for accepting a Signal, for example, based on the current location of the contributors. Private and public WebRTC push can potentially be the same Input type. Private WebRTC push could define an additional predicate, for example, a contributor must be present and a member of a certain team. On the other hand, HLS Pull Input is owned by a team, but not a single user.

Streams can be recorded. Whether a Stream is recorded may change during its lifetime. Streams that have not been recorded are lost and not recoverable. A Stream's URL can be selected based on a mime-type. One implementation of the LVC platform builds a subset of Stream URLs for a given mime-type. If the resulting set contains more than one entry, the result is chosen randomly using round-robin load balancing.

FIG. 22 shows example of a flow diagram amongst entities of the LVC platform. As shown, an external actor named Device inside a cloud, connects to an Ingest server (1), which validates the connection via its Input (2). Assuming the Input, e.g., a WebRTC Push Input, is accepted, it creates and announces a new Stream to the LVC platform (3). Once routing relations are evaluated (4), three Routings are applied to the accepted Stream (5), namely, Routing to an Output, a Production or a Recorder.

FIG. 23 shows a flow chart that exemplifies implementing an embodiment of the invention in a method implemented by logic in the LVC platform. A shown, the LVC platform provides log in interfaces for operators of publishes/owners of programs, who are identified by universally unique publisher IDs. The operators create and manage individual or groups/teams who contribute public or private Streams. The operators create Inputs that identify Streams and associate predicate logic for accepting or rejecting the contributed Signals. An Admission Control process accepts contributed Signals based on Input logic that identify such Signals based on user/operator defined predicates. A decision logic checks an admission control predicate to determine whether it is True or False based on the user defined predicates. Based on the determination, contributed Signals are rejected or accepted. One logic may accept Signals if the associated predicate is TRUE and reject Signals if the associated predicate is FALSE. Opposite logic may accept Signals if the associated predicate is FALSE and reject Signals if the associated predicate is TRUE. In one embodiment, the logical choices are made by the operators who access the LVC platform. Such operators also specify Routings for Inputs based on Routing Rule applied to accepted Streams. In one example, the operators specify predicates for Routing from Sources to Destinations. All operator specified or otherwise created Inputs, Routings and Input and Routing predicates as well as Program Transformation parameters are stored in the DBSM shown in FIG. 2. The predicates are checked by retrieving the predicates and applying them to the admission control and routing logical processes for routing accepted Streams based on Routing Rules to Outputs based on Program Transformations.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one Input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide Input to the computer. Other kinds of devices can be used to provide for interaction with a user as well; for example, feedback provided to the user can be any form of sensory feedback (e.g., visual feedback, auditory feedback, or tactile feedback), and Input from the user can be received in any form, including acoustic, speech, or tactile Input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include scalable servers for example implemented in the clouds comprising a plurality of scalable processors that execute the logical entities, e.g., Inputs, Streams, Routings and Outputs described above in order to meet a wide array of program production needs. For example, as the number of contributes Signals increase, more p[processors can be deployed to implement the described logical entities. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

The invention claimed is:

1. A method executed in a computing system for producing programs that use signals received over communication channels from one or more sources comprising the steps of:
   a) executing an application software in one or more servers of the computing system, wherein at least one of the one or more servers has one or more processors that process defined logical entities, wherein each logical entity is represented by a corresponding data structure stored in a storage system, which is used to perform a functional activity;
   b) receiving a signal used in production of a program from a source over a communication channel;
   c) defining an input logical entity comprising a first data structure defining an attribute specified by a routing rule used for routing the signal, wherein the input logical entity is responsive to a user defined predicate comprising a logical expression used for accepting or rejecting the signal;
   d) defining a stream logical entity comprising a second data structure used to identify an accepted signal;
   e) defining a routing logical entity that establishes a connection to a destination; and
   f) routing the accepted signal to the destination based on the attribute used for a routing the accepted signal.

2. The method of claim 1 further including the step of defining an output logical entity comprising a fourth data structure that associates the stream logical entity with the destination.

3. The method of claim 2, wherein the output logical entity transforms the stream logical entity according to a user defined program transformation rule that is evaluated for mapping the accepted signal to the destination.

4. The method of claim 3, wherein the signal is an MPEG signal, and wherein the user defined program transformation rule is based on Program Specific information (PSI).

5. The method of claim 4, wherein the stream logical entity is associated with Packetized Elementary Stream (PES).

6. The method of claim 5, wherein the PSI includes Program Mapping Table (PMT), and wherein the stream logical entity is associated with PMT.

7. The method of claim 4, wherein an inter arrival time (IAT) of packets of the MPEG signal is recorded at a server and used by the output logical entity for achieving a constant bitrate.

8. The method of claim 1, wherein the routing rule is a user defined logical rule associated with the input logical entity, and wherein a user defined logical rule is evaluated when the signal is applied to the input logical entity.

9. The method of claim 1, wherein the user defined predicate is based on time of day, a geographical zone, a location or an IP address.

10. The method of claim 1, wherein the input logical entity is defined as a persistent logical entity by a user.

11. The method of claim 10, wherein the input logical entity is configured by the user via graphical user interfaces or Application Programing Interfaces (APIs).

12. The method of claim 1, wherein the stream logical entity is associated with a session tag that creates a topical connection.

13. The method of claim 1, wherein the stream logical entity is associated a unique identification (ID) of the owner or publisher of the signal.

14. The method of claim 1 further including recognizing a characteristic of the signal based on a confidence level and using the recognized characteristic as a metadata associated with the signal.

* * * * *